United States Patent
Chaddha et al.

(10) Patent No.: US 7,660,731 B2
(45) Date of Patent: Feb. 9, 2010

(54) METHOD AND APPARATUS FOR TECHNOLOGY RESOURCE MANAGEMENT

(75) Inventors: Parmeet S. Chaddha, Foster City, CA (US); William Stuart Gallie, Los Altos, CA (US); Arthur L. Chin, Belmont, CA (US); Tino Martinez, Mesa, AZ (US); Mark Milatovich, San Francisco, CA (US); Oisin Joseph O'Crowley, San Rafael, CA (US); Kamini Rai, San Francisco, CA (US); Sandeep Masrani, San Mateo, CA (US); John Whittle, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/511,613

(22) Filed: Aug. 28, 2006

(65) Prior Publication Data

US 2006/0293942 A1 Dec. 28, 2006

Related U.S. Application Data

(63) Continuation of application No. 10/187,146, filed on Jun. 28, 2002, now abandoned.

(60) Provisional application No. 60/370,883, filed on Apr. 6, 2002.

(51) Int. Cl.
G06F 9/46 (2006.01)
(52) U.S. Cl. ........................................ 705/8
(58) Field of Classification Search .................. 705/8, 705/7
See application file for complete search history.

(56) References Cited

U.S. PATENT DOCUMENTS

| | | | | |
|---|---|---|---|---|
| 6,081,518 | A * | 6/2000 | Bowman-Amuah | 370/352 |
| 6,925,493 | B1 * | 8/2005 | Barkan et al. | 709/223 |
| 7,062,559 | B2 * | 6/2006 | Yoshimura et al. | 709/226 |
| 7,437,449 | B1 * | 10/2008 | Monga et al. | 709/224 |
| 2002/0123901 | A1 * | 9/2002 | Nguyen et al. | 705/1 |
| 2002/0138398 | A1 * | 9/2002 | Kalin et al. | 705/37 |
| 2002/0143920 | A1 * | 10/2002 | Dev et al. | 709/223 |

(Continued)

OTHER PUBLICATIONS

Cori™ Intelligent Enterprise web site, retrieved from [URL: http://web.archive.org/web/20010405025944/corio.com/spd.cfm?spi=ias], archived on Apr. 5, 2001.*

(Continued)

*Primary Examiner*—Susanna M Diaz
(74) *Attorney, Agent, or Firm*—Karuna Ojanen; Arthur Samodovitz; Hamre, Schumann, Mueller & Larson PC

(57) ABSTRACT

Apparatus and methods to manage demand, service level agreements, hardware and software assets, projects, labor, knowledge and provisioning resources in hosted applications. An asset manager coupled to host servers and a network, manages the host servers and software to determine the demand for new assets and allocate available assets to meet the demand; determine assets not in compliance with existing software licenses; determine and compare actual service level metrics with the target service level metrics; and determine availability of a patch or upgrade for selected software and instances of the selected software among the assets. The asset manager may be coupled to other managers, e.g., contract, product, work and/or accounting managers, to monitor service level metrics and/or costs.

6 Claims, 17 Drawing Sheets

Service Level Compliance

U.S. PATENT DOCUMENTS

| | | | |
|---|---|---|---|
| 2002/0152305 A1* | 10/2002 | Jackson et al. | 709/224 |
| 2002/0181685 A1* | 12/2002 | Doherty et al. | 379/201.12 |
| 2003/0028642 A1* | 2/2003 | Agarwal et al. | 709/226 |
| 2003/0041131 A1* | 2/2003 | Westerinen et al. | 709/221 |
| 2003/0118029 A1* | 6/2003 | Maher et al. | 370/395.21 |
| 2003/0187970 A1* | 10/2003 | Chase et al. | 709/223 |
| 2004/0153563 A1* | 8/2004 | Shay et al. | 709/232 |
| 2006/0178918 A1* | 8/2006 | Mikurak | 705/7 |
| 2006/0206619 A1* | 9/2006 | Dan et al. | 709/233 |
| 2006/0229935 A1* | 10/2006 | Subbloie et al. | 705/11 |
| 2007/0088819 A1* | 4/2007 | Sinha | 709/224 |

OTHER PUBLICATIONS

"Peregrine Systems® Announces Successful AssetCenter® and Action Request System® Integration by Siemens." PR Newswire, p. LAW06712122001, Dec. 12, 2001.*

"Peregrine Systems Announces Next Generation Employee Self-Service Solution." PR Newswire, p. 7626, Dec. 8, 1999.*

* cited by examiner

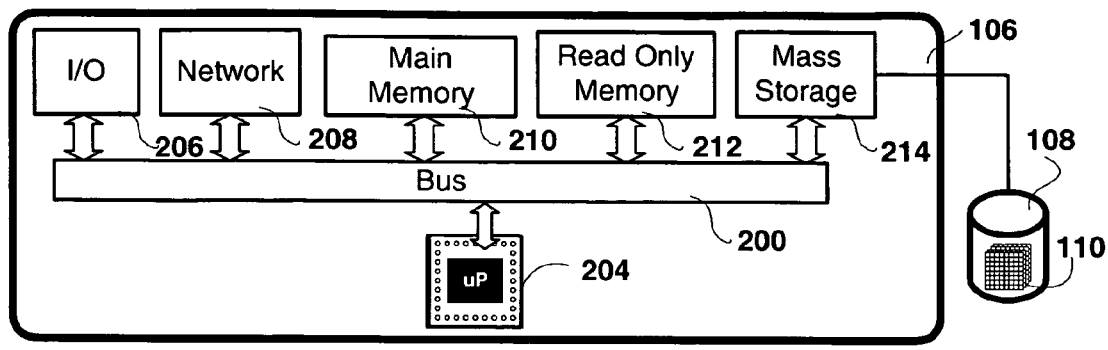
FIG. 2
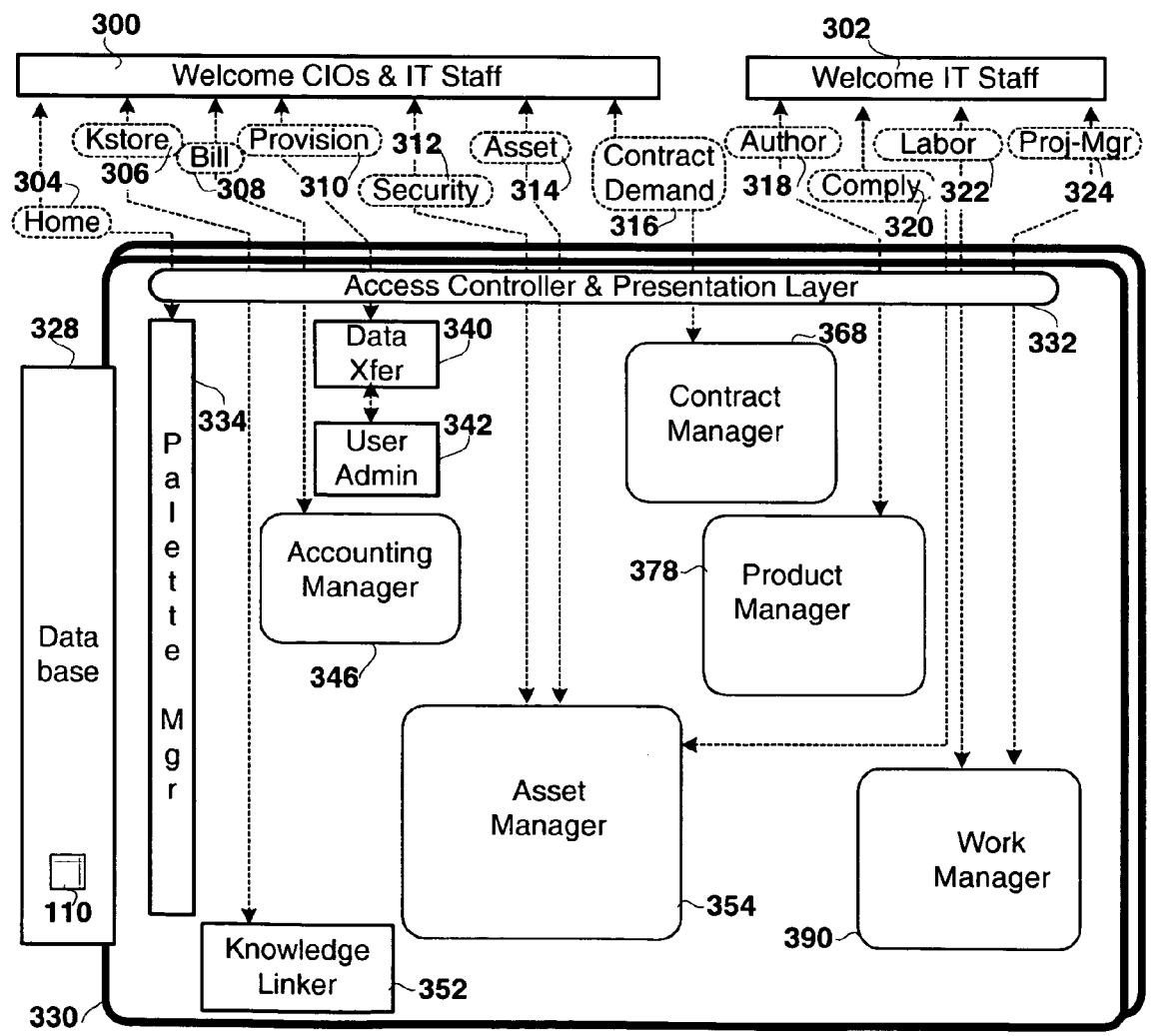
FIG. 3A Technology Resource Manager

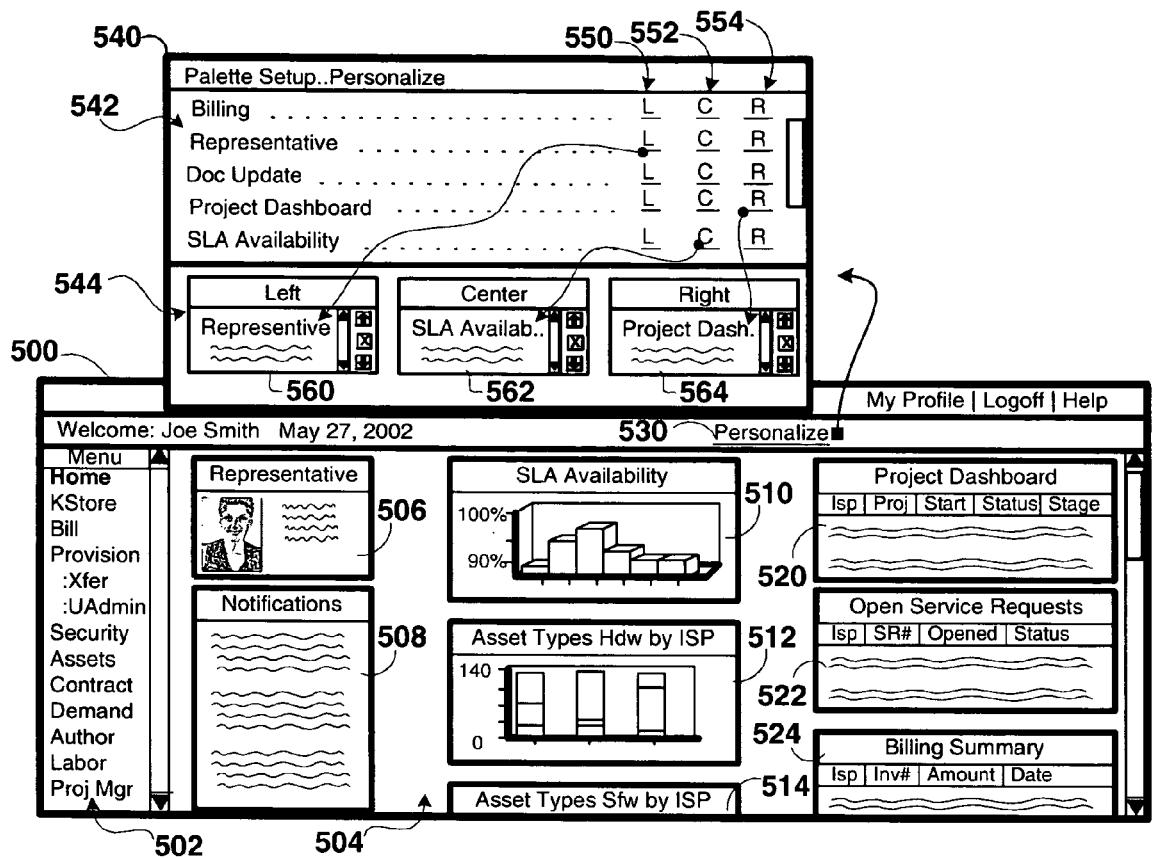
FIG. 5    TRM: Home GUI
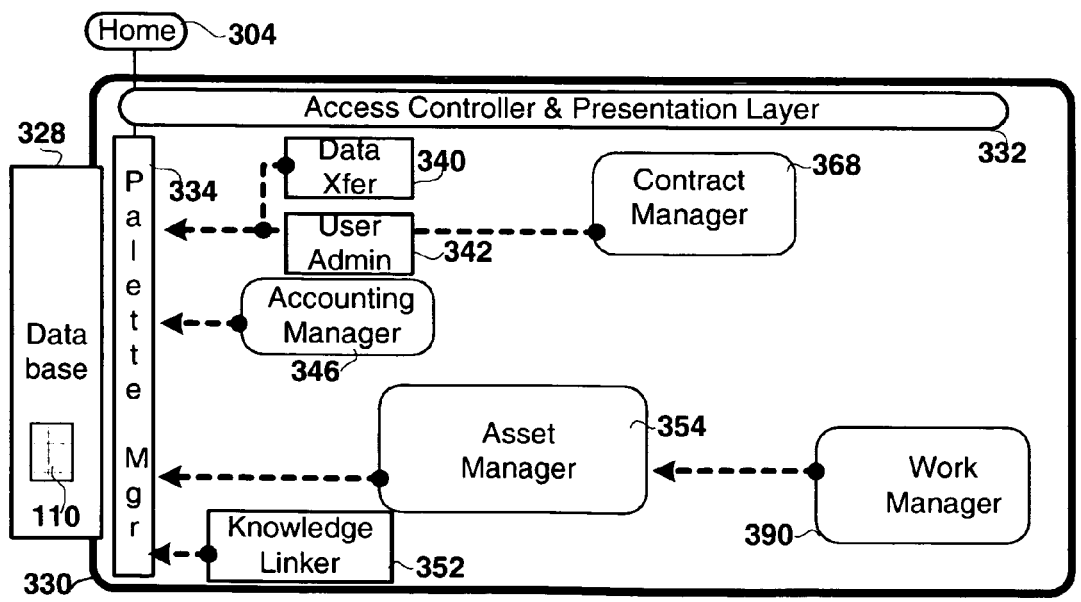
FIG. 3B    TRM: Home

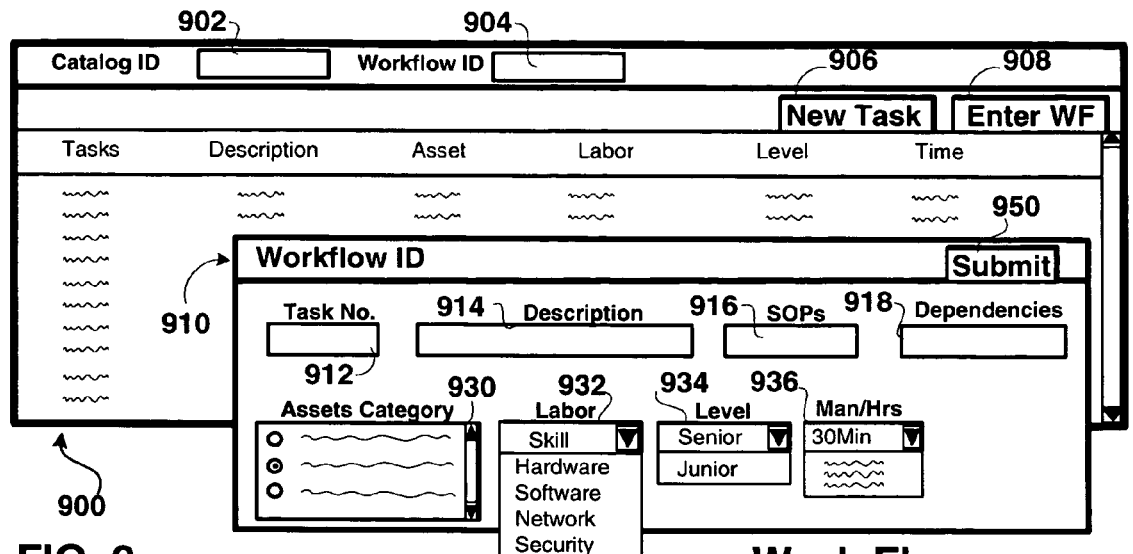
FIG. 9  Work Flow
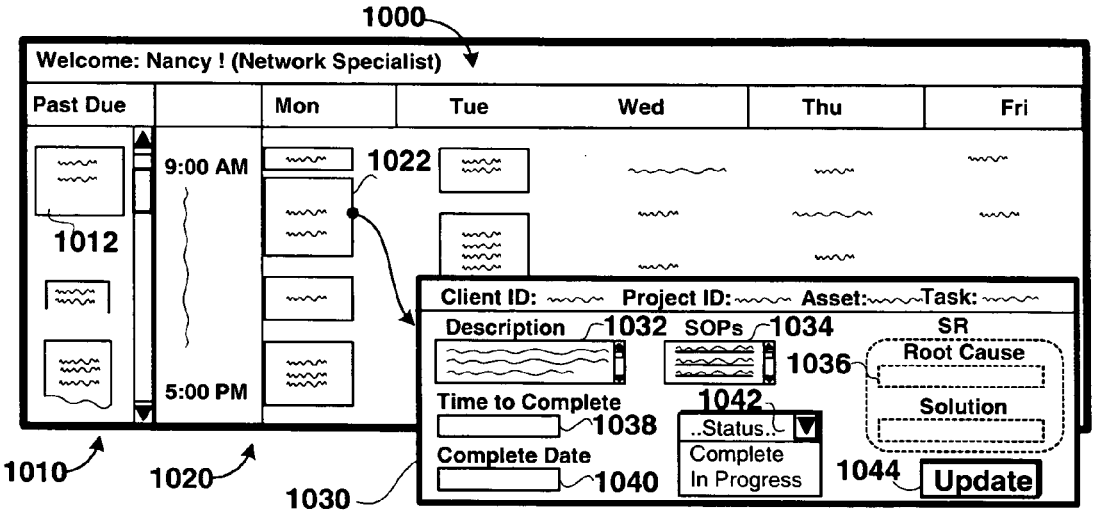
FIG. 10  Employee Labor
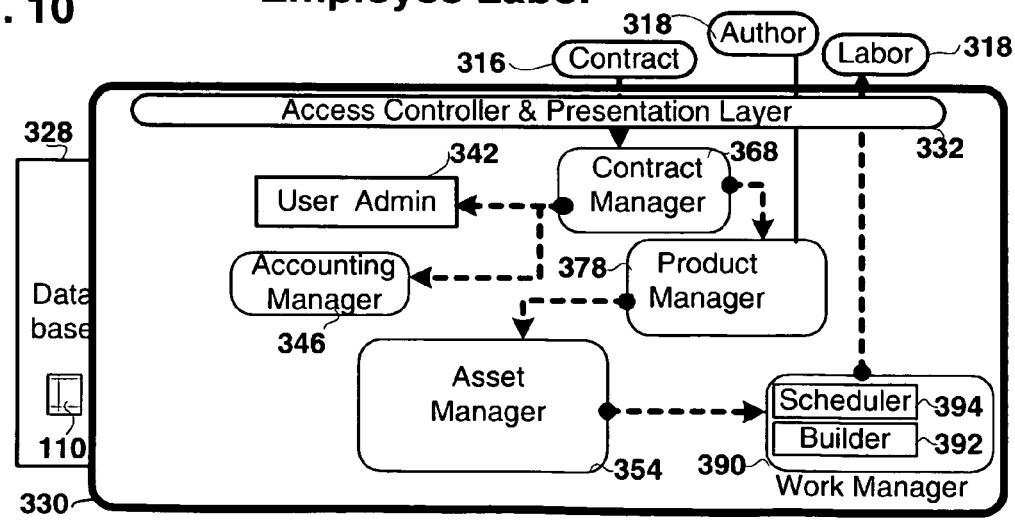
FIG. 3C  TRM: Demand & Scheduling

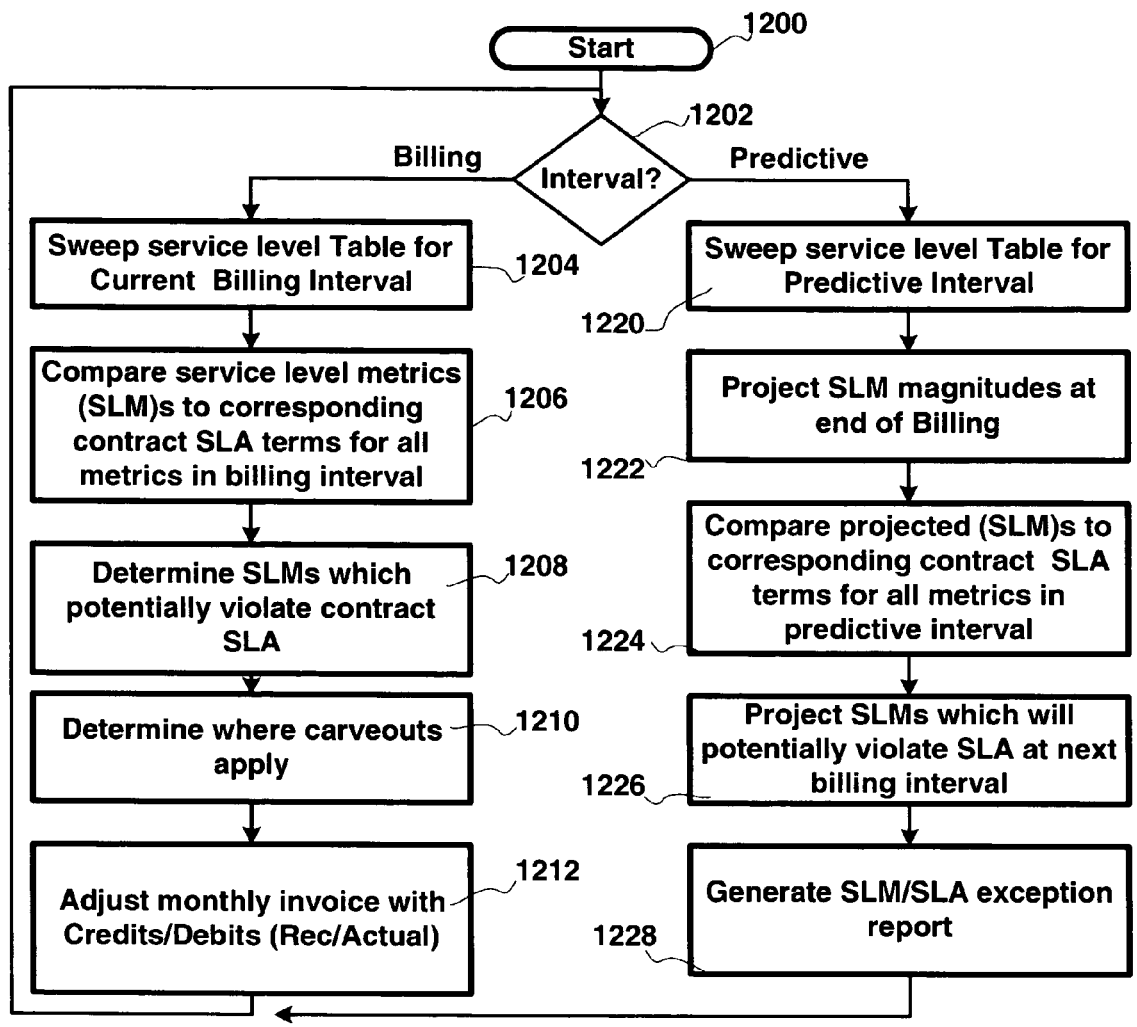
FIG. 12  Service Level Compliance
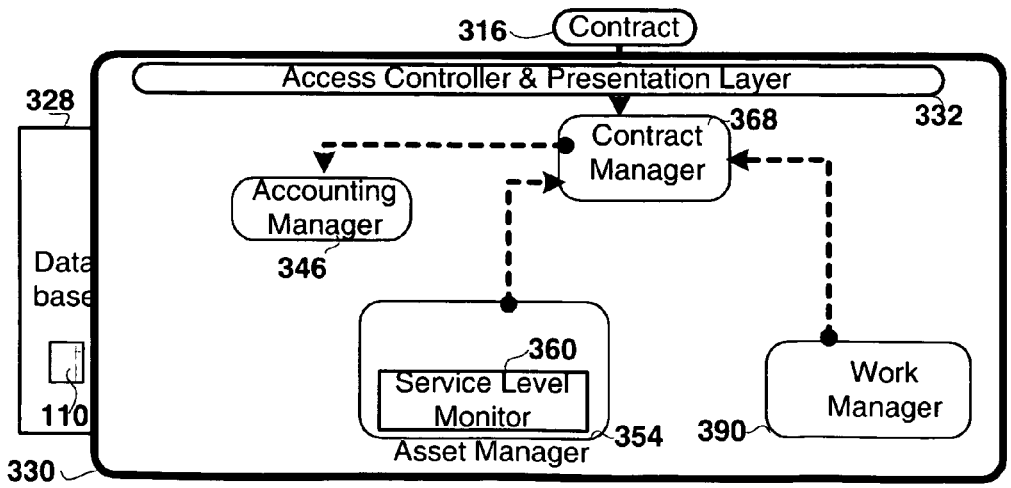
FIG. 3D  TRM Service Level Compliance

FIG. 13  License/Lease Compliance and Order
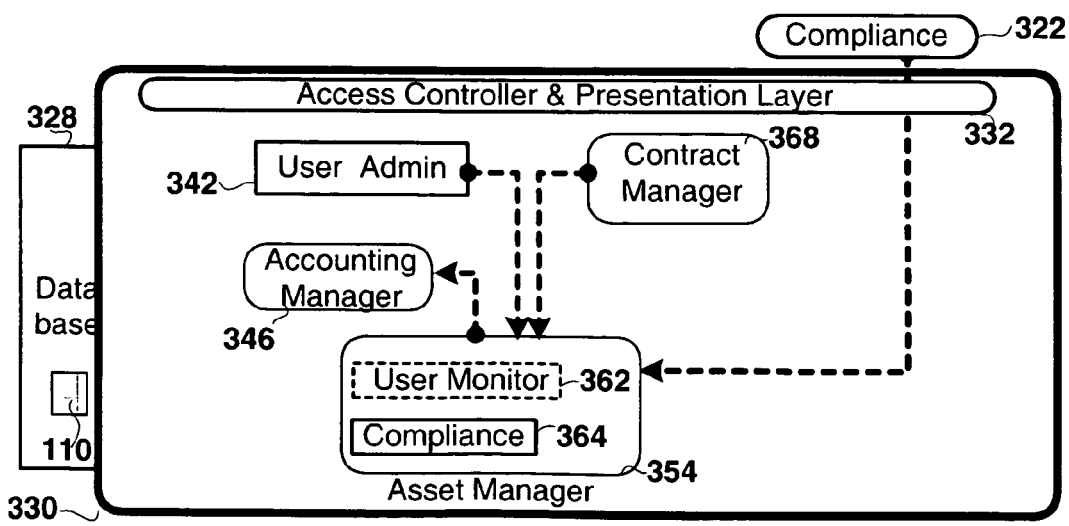
FIG. 3E  TRM: License/Lease Compliance & Order

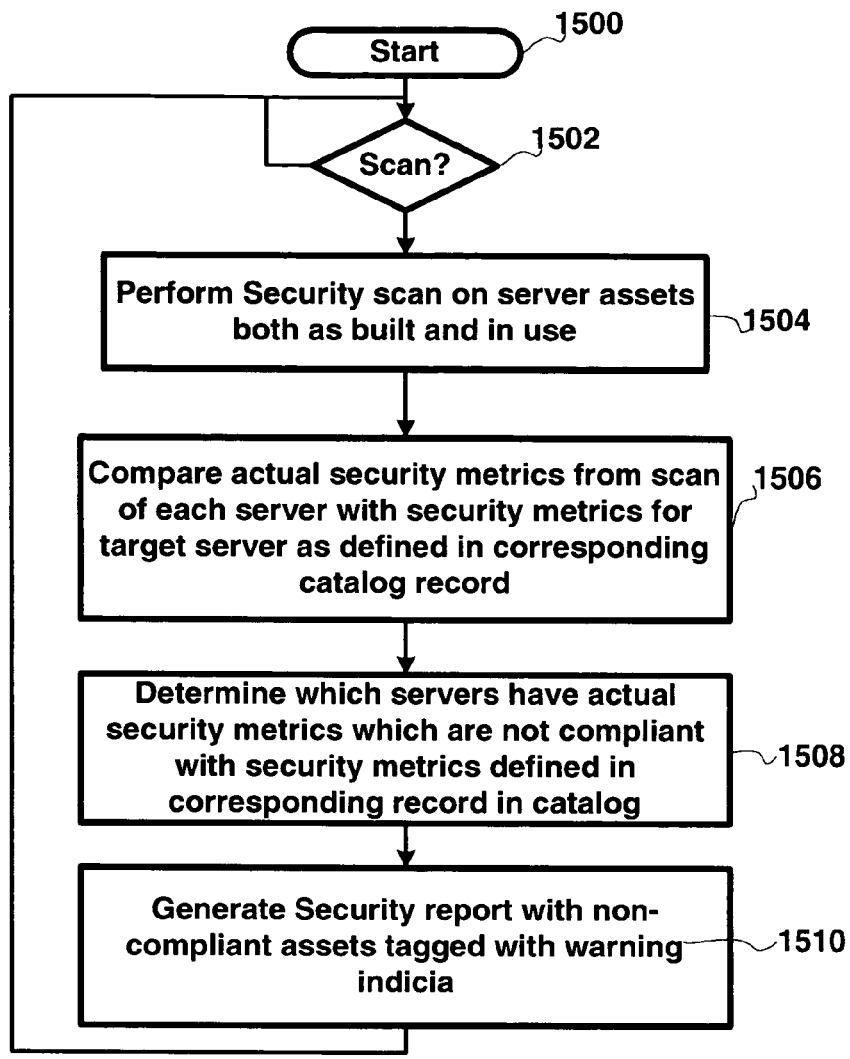
FIG. 15  Security Compliance
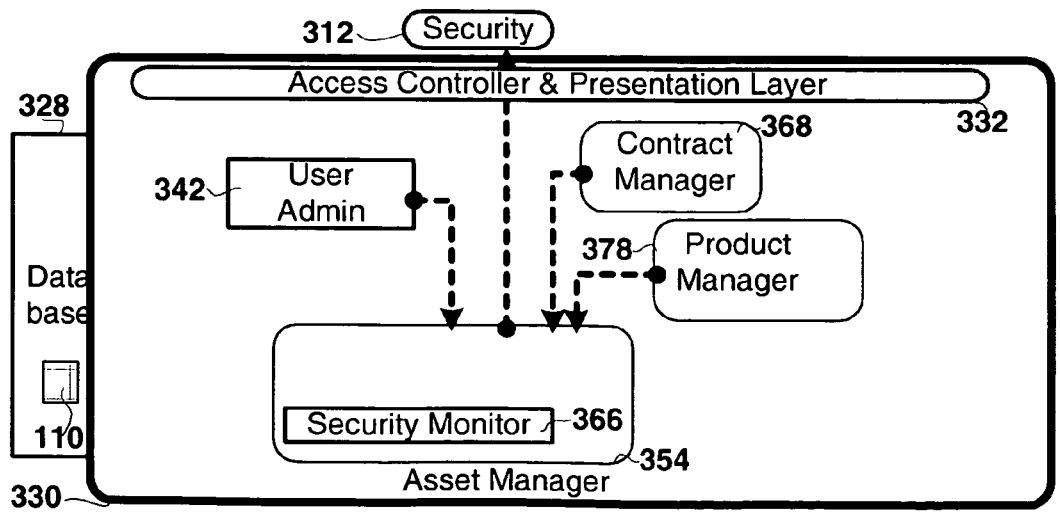
FIG. 3F    TRM: Security Compliance

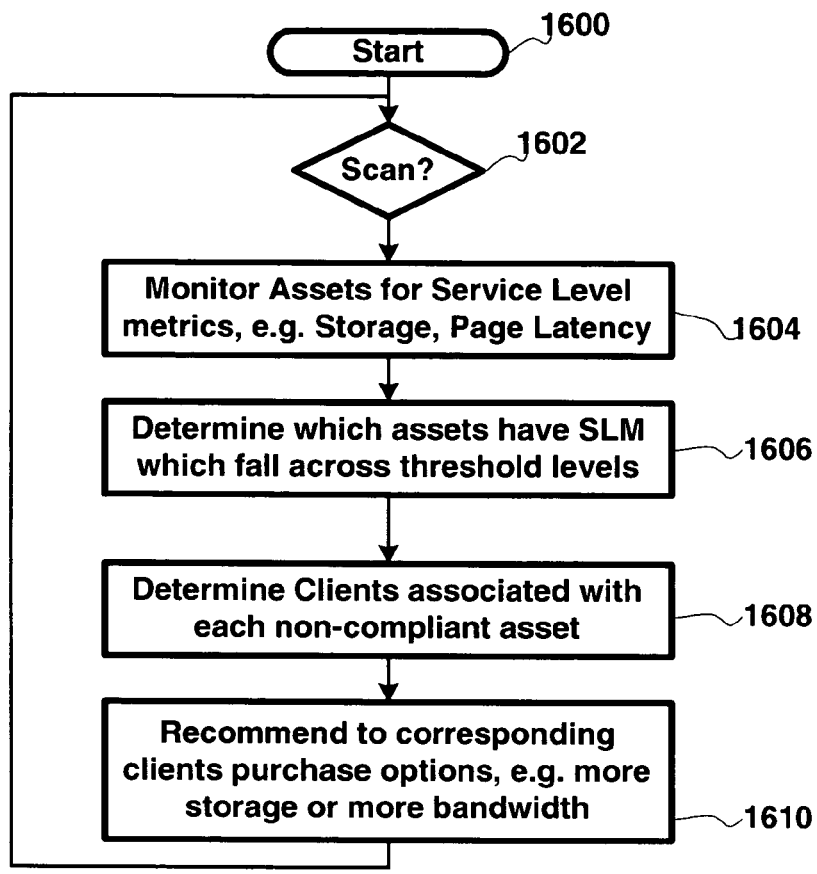
FIG. 16  Provisioning Recommendation
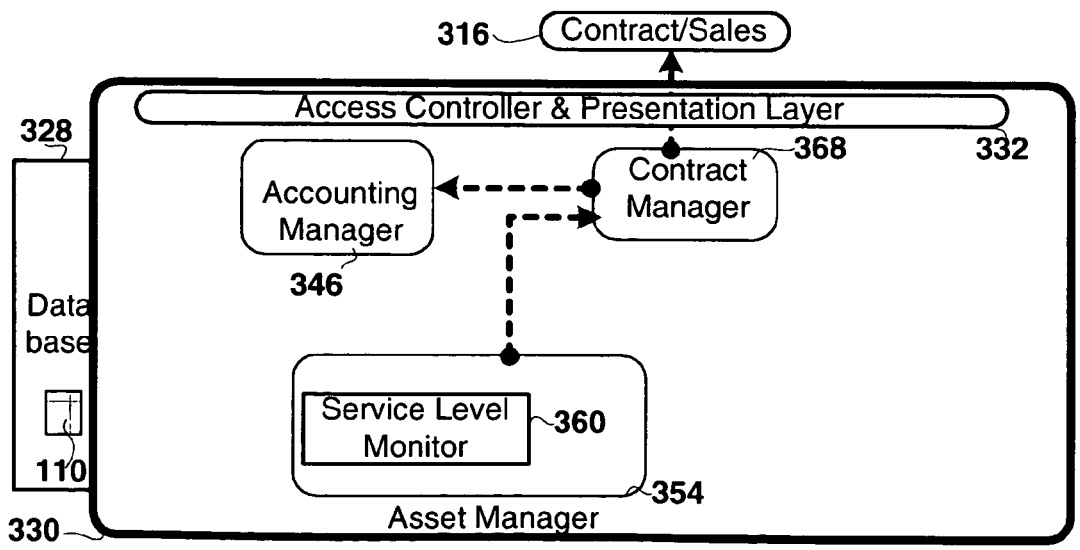
FIG. 3G  TRM: Provisioning Recommendation

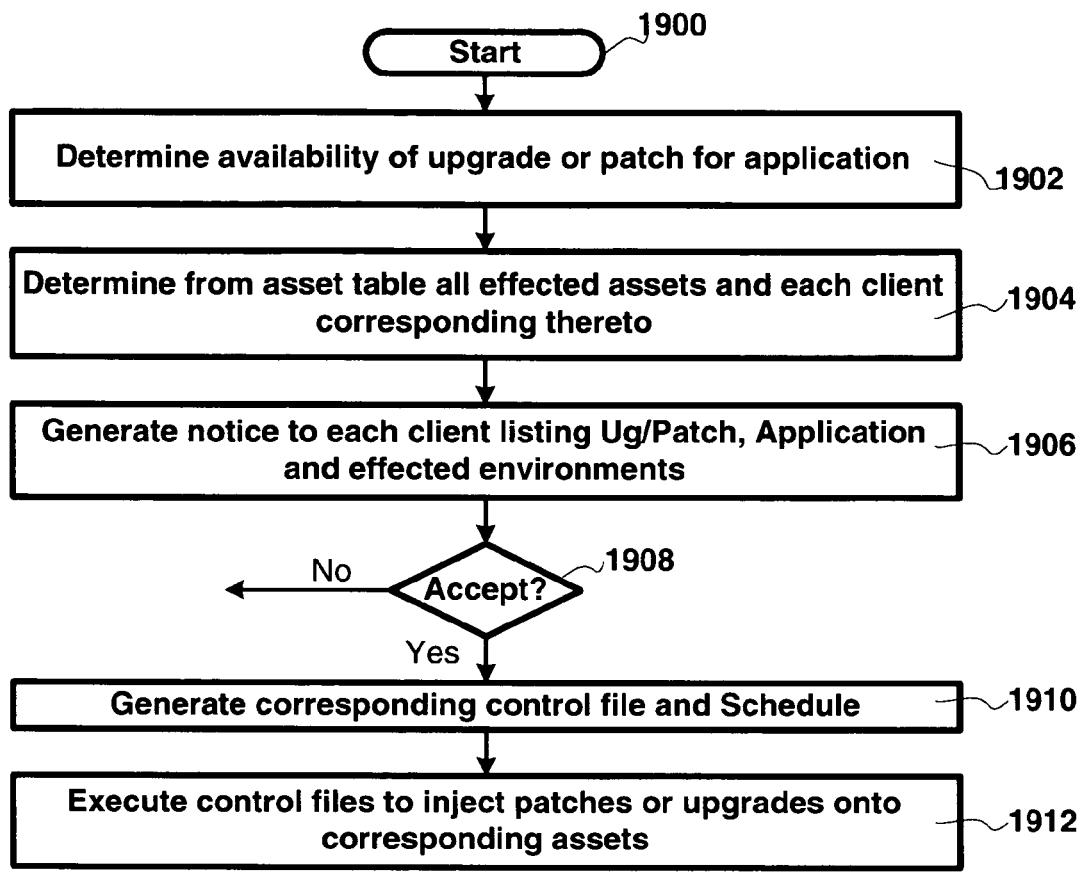
FIG. 19  Management of Patches & Upgrades
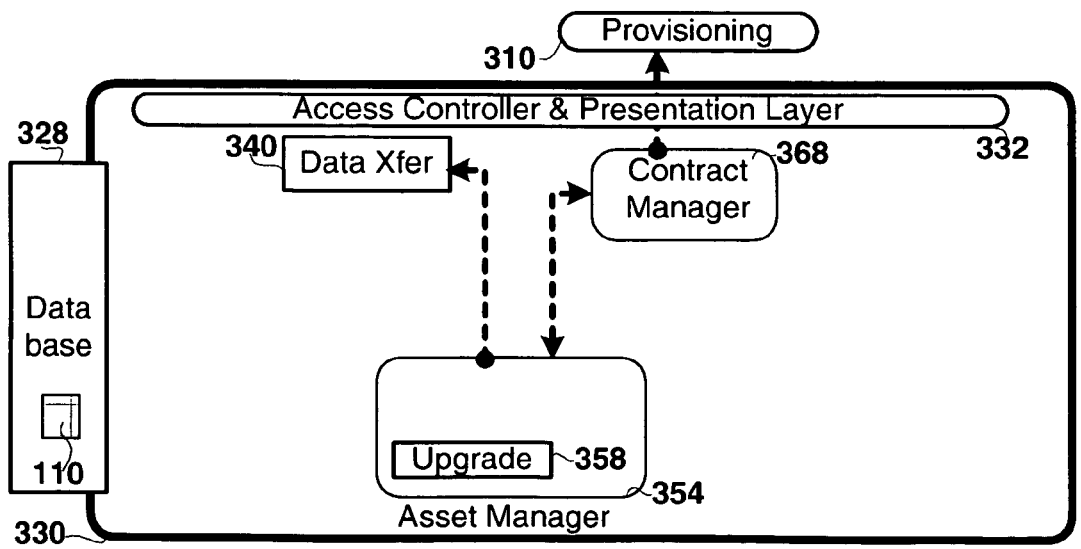
FIG. 3H    TRM:  Management of Patches & Upgrades

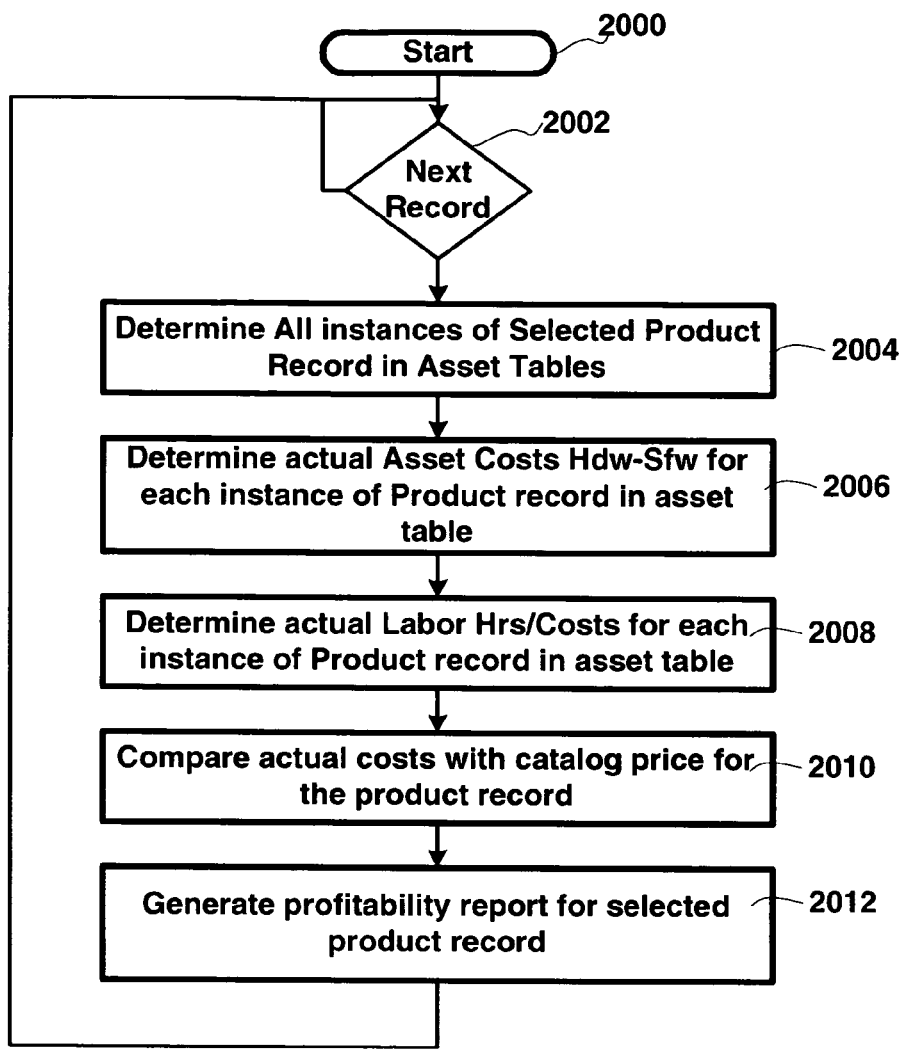
FIG. 20 Product Modeling
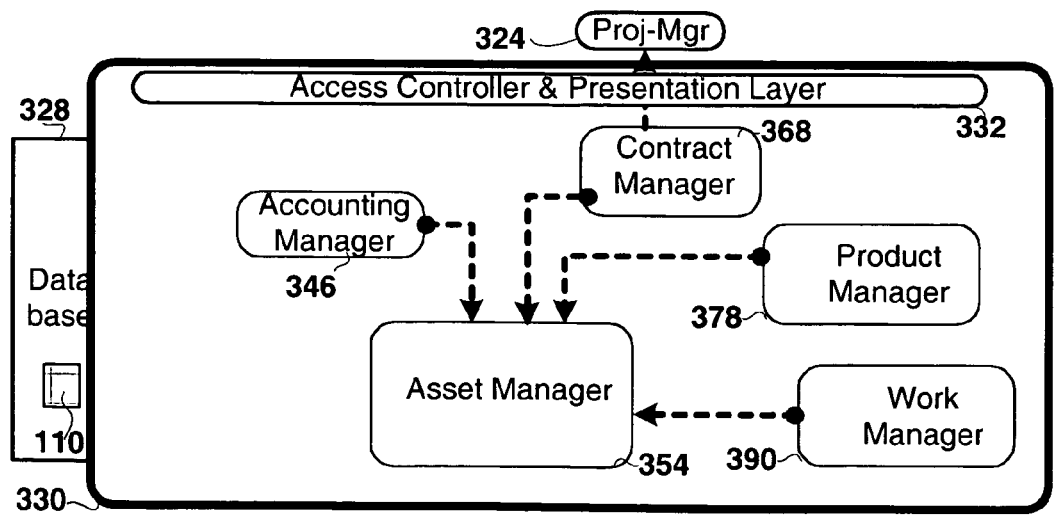
FIG. 31 TRM Product Modeling

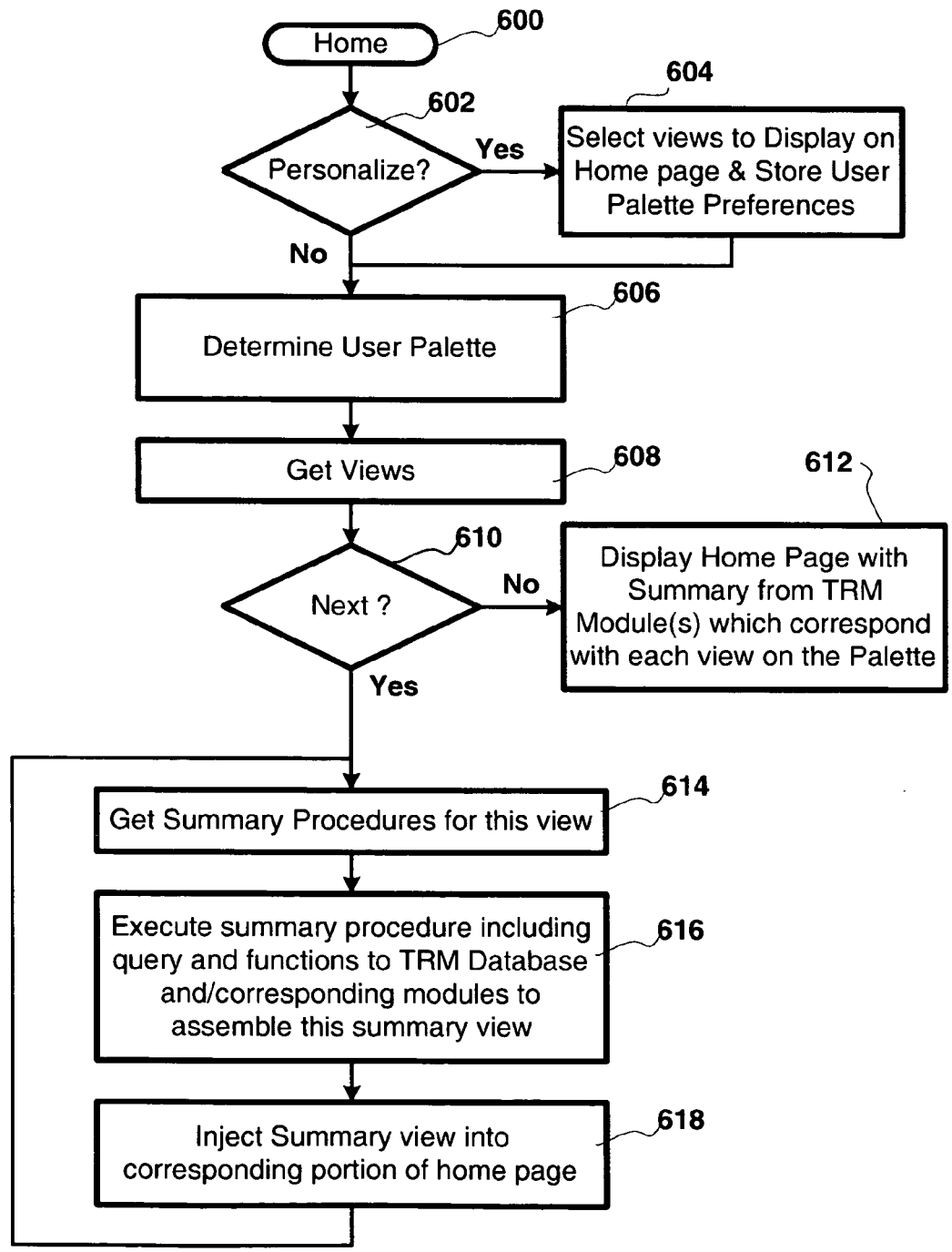
FIG. 6 TRM: Home

FIG. 7 Contract

| | 710 Uptime | 712 Response Time | 714 Carveouts | 716 Penalty |
|---|---|---|---|---|
| Client 702 | ● 99.9% | | Scheduled Downtime | xx %/mo |
| Term Date 704 | ○ 99.5% | Sev 1  00:15  04:00 | Defect in Application | |
| Pmt Terms 706 | ○ 99.0% | Sev 2  02:00  12:00 | Client Error | |
| FreeSupport 708 | | Sev 3  24:00  24:00 | | |

Contract: ID # — Submit (750)

| 720 Line | 722 Application | 724 User # | 726 Architecture | 728 Environment | 730 Bkup | 732 Mtr | 734 Rcvy | 736 Milestone | 738 Sched | 740 Price |
|---|---|---|---|---|---|---|---|---|---|---|
| 1 | CustRelMgt ▼ | | 2 Tier ▼ | Develop ▼ | ☒ | ☒ | ☒ | | | |
| 2 | Finance ▼ | | 3 Tier ▼ | Develop ▼ | ☐ | ☐ | ☐ | | | |
| 3 | | | | | ☐ | ☐ | ☐ | | | |

Dropdown (718): CustRelMgt / Exchange
Dropdown: 3 Tier / 2 Tier / 1 Tier
Dropdown: Develop / Test / User Accept / Train / Production

FIG. 8 Catalog

Catalog | New | Enter | Web Agent (806) | WebApplication (808) | DataBase (810)

| Tier Env Name | Server # 001 ▼ 822 | 001 ▼ 824 | 826 001 ▼ |
|---|---|---|---|
| ☒ 3 Dev D1 | Hardware: ~~~ OS: ~~~ Web Agent: ~~~ | Hardware: ~~~ OS: ~~~ Web Application: ~~~ | Hardware: ~~~ OS: ~~~ Database: ~~~ |
| ☐ 3 Dev D2 | | | |
| ☐ 3 Prod P1 | | | |

2-Tier (840) — Server # 842 001 ▼ — 844 001 ▼

| ☐ 2 Dev D1 | | |

1-Tier (850) — Server # 852 001 ▼

| ☐ 1 Dev D1 | |

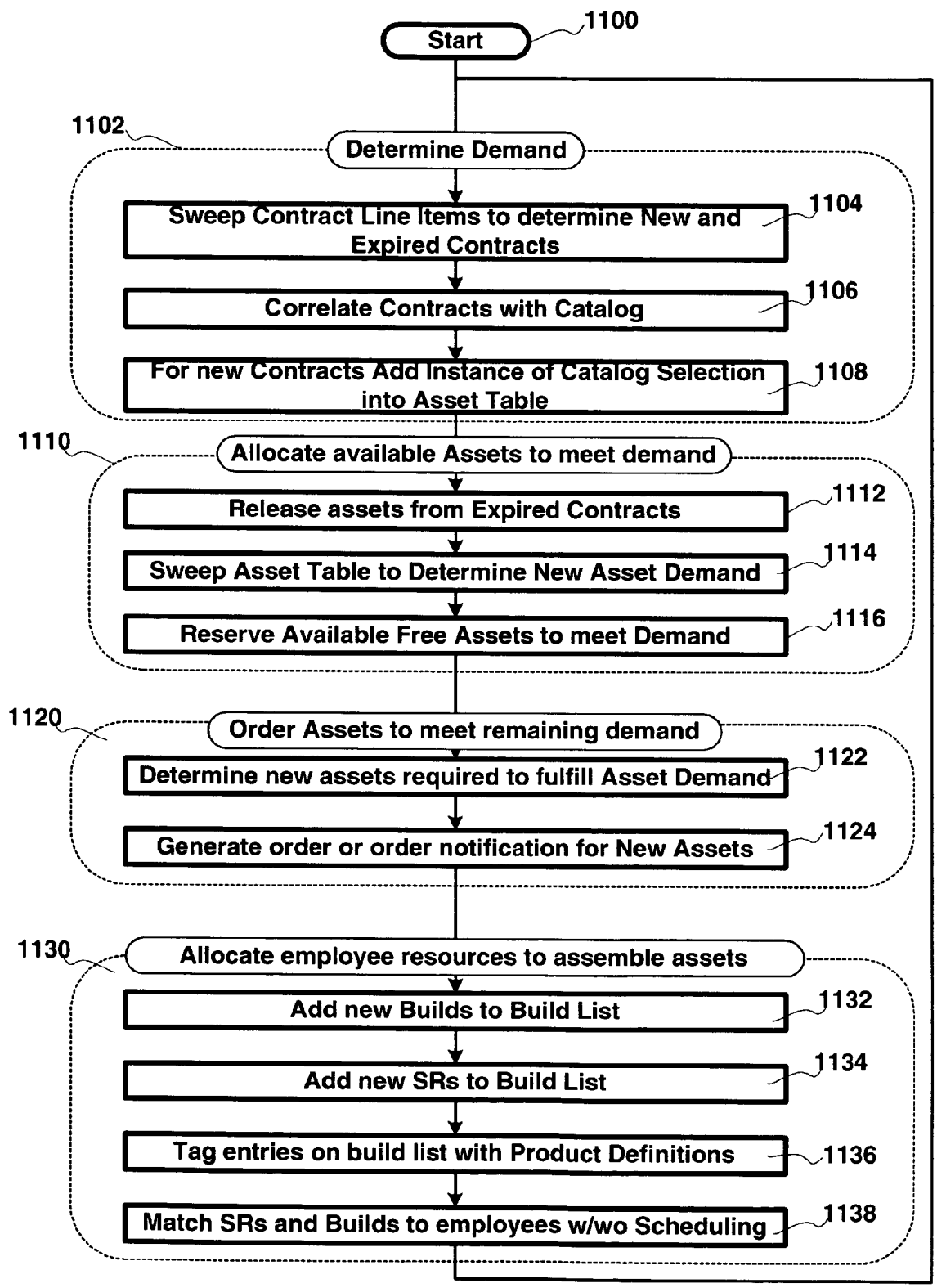
FIG. 11  TRM: Demand and Scheduling

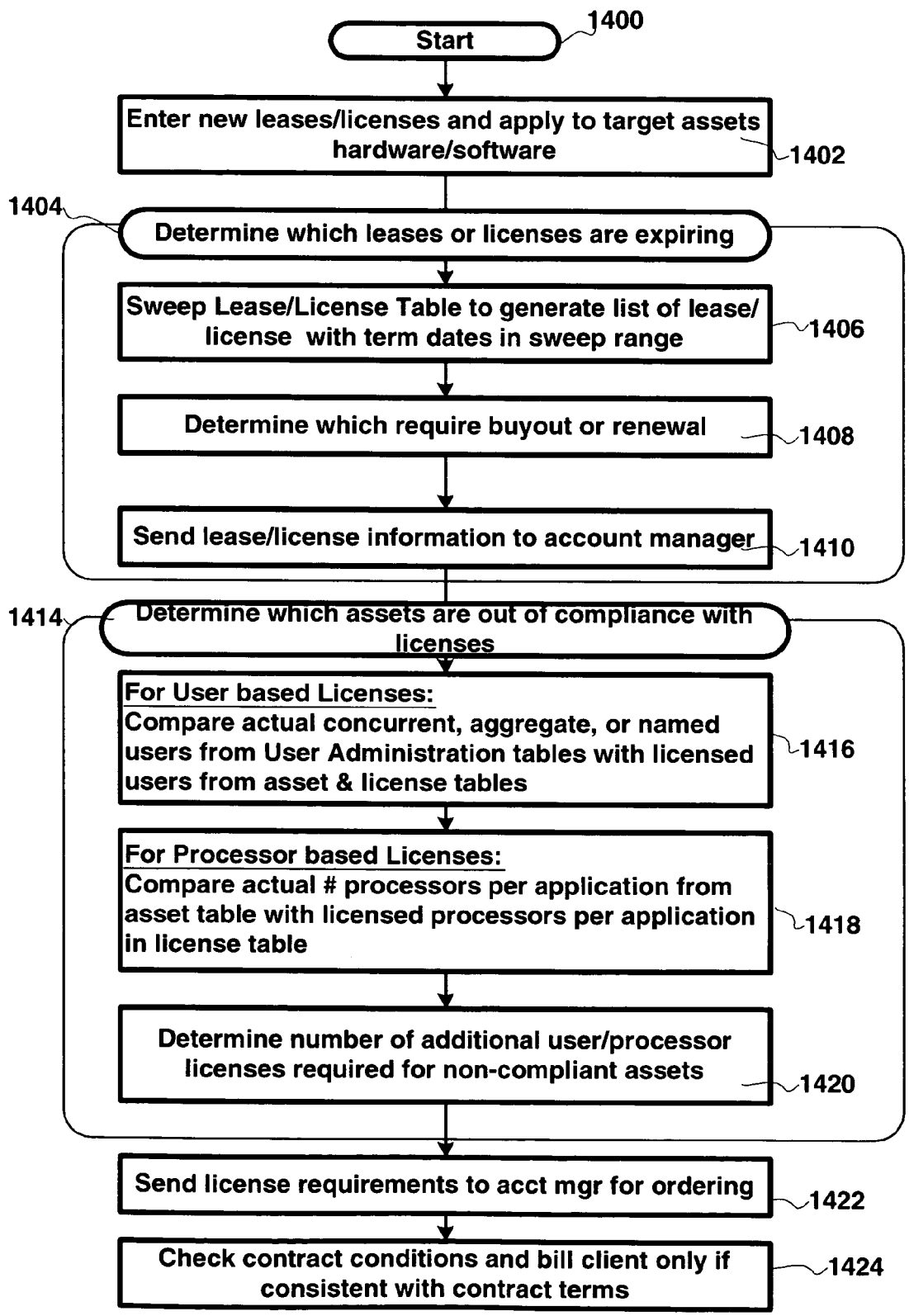
FIG. 14 License/Lease Order and Compliance

METHOD AND APPARATUS FOR TECHNOLOGY RESOURCE MANAGEMENT

CROSS REFERENCE TO RELATED APPLICATION

This application is a Continuation of application Ser. No. 10/187,146 filed on Jun. 28, 2002 now abandoned entitled "Method and Apparatus for Technology Resource Management" and claims priority thereon as well as the benefit of prior filed co-pending Provisional Application No. 60/370,883 filed on Apr. 6, 2002 entitled "iSRVCE Technology Resource Management (TRM)" which is incorporated herein by reference in its entirety as if fully set forth herein.

BACKGROUND OF THE INVENTION

1. Field of Invention

The field of the present invention relates in general to networks and more particularly to the managing of applications on networks.

2. Description of the Related Art

The growth of the global network identified as the Internet has in part been spawned by a range of software applications made available on the Internet. These include online catalogs; shopping; financial services; financials management; human resource management; business exchanges; customer relationship management; and entertainment such as news and sports. Each of these online applications requires a complex set of hardware and software for delivery. The hardware elements include at a minimum: firewalls; switches; routers; web, application and database servers and backup devices all of which need to be connected to the Internet. The skill sets required to manage these elements and the associated software are formidable.

The management task is made more formidable by the availability and security requirements for online applications. Typically an online application must target 24/7/365 availability. This availability target dictates the introduction of redundancy into the hardware and software which in turn adds to the complexity of the management task. The security requirements are dictated by the nature of the information, typically highly sensitive, being transmitted and stored by each of the applications. Since the Internet is an open medium the hardware environment used to provide the application is subject to constant threat of attack. Even when information is transmitted the packets in which it is bundled may be intercepted. Various measures and counter-measures exists to address each security issue, but they are in a constant state of flux.

Not surprisingly the task of managing and provisioning of Internet applications has fallen on the shoulders of a specialized class of service providers sometimes identified as Application Service Providers (ASPs). These service providers may be part of a large enterprise or a separate entity from the customer enterprise and may be part of the businesses that provide a specific application or may exist separately from the businesses which provide a specific application. They manage and distribute software-based services and solutions to customers across a wide area network such as the Internet from a central data center on which the applications are hosted. In essence, ASPs provide a way for companies to outsource some aspects of their information technology (IT) needs. A typical ASP manages the hosting of multiple applications for multiple businesses, with each application having its own discrete client audiences. The ASP is thus in a position to justify the considerable investment is personnel, hardware, and software needed to host Internet applications.

Success or failure of an ASP rests on providing personalized solutions for each client group, e.g. corporation, department, division, subsidiary etc. A typical ASP achieves this level of service with a corresponding growth in personnel, which cuts into profitability. What is needed are new service solutions for ASPs which enhance profitability and improve customer responsiveness.

SUMMARY OF THE INVENTION

A method and apparatus for managing technology resources is disclosed. The technology resource manager (TRM) application provides information technology (IT) professionals with an integrated and comprehensive software environment to manage and automate the various processes associated with technology resource management. Technological resources include: personnel; host servers and software deployed thereon, software licenses, hardware leases, security and monitoring tools, process workflows and standard operating procedures to meet the demands of managing network delivered applications across the entire technology stack. The TRM manages in various embodiments of the invention: demand (service requests/trouble tickets), service level agreements (SLA), assets (both hardware and software), projects, labor, knowledge, self-service provisioning and IT metrics for hosted applications. The TRM provides visibility and control to IT professionals within the ASP organization over all hosted applications, and visibility and control to IT administrators within each of the client groups covering the applications hosted for the corresponding client group.

In an embodiment of the invention an apparatus for managing technology resources is disclosed. Technology resources include host servers selected ones of which provide at least one application accessible to clients across a network. The apparatus includes an asset manager configured to couple to the host servers and to the network. The asset manager manages assets including the host servers and software deployed thereon by determining demand for new assets and by allocating available assets to meet the demand.

In another embodiment of the invention the apparatus for managing technology resources includes: a contract manager and an asset manager. The contract manager manages contracts for each client, with each contract expressed in terms of contract parameters which include: service level metrics, carveouts, penalties and other terms and conditions. The asset manager couples to the contract manager and is configured to couple to the host servers and to the network. The asset manager manages assets including the host servers and software deployed thereon by monitoring actual service level metrics of the assets and by determining the assets for which actual monitored service level metrics violate contract service level metrics managed by the contract manager.

In an embodiment of the invention the apparatus for managing technology resources includes: an asset manager configured to couple to the host servers and to the network, to manage assets including the host servers, software deployed thereon, and associated leases and licenses. The asset manager compares monitored software utilization on each of the host servers with the corresponding licenses to determine non-compliant assets.

In an embodiment of the invention the apparatus for managing technology resources includes: a product manager and an asset manager. The product manager manages product definitions including a catalog with product records each of which lists the assets associated with each product and security metrics for each asset. The asset manager couples to the product manager and is configured to couple to the host servers and the network. The asset manager manages assets including the host servers and software deployed thereon. The asset manager compares actual security metrics from a scan of each host server with target security metrics for the corresponding host server in the corresponding product record to determine which host servers have actual security metrics which are not compliant with the target security metrics.

In still another embodiment of the invention the apparatus for managing technology resources includes: an asset manager configured to couple to the host servers and the network, to manage assets including the host servers. The asset manager compares the actual service level metrics from a scan of each host server with target service level metrics to determine which host servers have actual service level metrics which are not compliant with the target service level metrics.

In another embodiment of the invention the apparatus for managing technology resources includes: an asset manager configured to couple to the host servers and the network to manage assets including the host servers and software deployed thereon. The asset manager determines availability of a patch or upgrade for selected software and instances of the selected software among the assets.

In an embodiment of the invention the apparatus for managing technology resources includes: a product manager, a work manager, an accounting manager and an asset manager. The product manager manages product definitions including a catalog with product records each of which includes a price and a list of corresponding assets. The work manager manages information technology staff workload, task assignment and activities performed on assets including: assembly, installation configuration and maintenance for example. The work manager is responsive to a demand for new assets to allocate selected ones of the information technology staff to assemble the new assets. The accounting manager is responsive to the demand for new assets to order any additional assets required to meet the demand. The asset manager couples to the product manager, the work manager, the accounting manager and is configured to couple to the host servers and the network, to manage assets including the host servers and software deployed thereon. The asset manager is responsive to demand for new assets which correlate with a product record in the catalog to compare the actual costs of the new assets from the accounting manager and the work manager with the price of the assets from the product record.

Related methods and software are also disclosed and claimed.

BRIEF DESCRIPTION OF THE DRAWINGS

These and other features and advantages of the present invention will become more apparent to those skilled in the art from the following detailed description in conjunction with the appended drawings in which:

FIG. 2 is a hardware block diagram of a computer suitable for use in executing the processes associated with the TRM shown in FIG. 1.

FIGS. 3A-I are software block diagrams of various embodiments of the TRM shown in FIG. 1.

FIG. 5 shows an embodiment of a graphical user interfaces (GUI) associated with a palette manager portion of the TRM which provides for setup and delivery of a customized "home" page view of the TRM.

FIG. 6 is a process flow diagram showing an embodiment of the processes performed by the palette manager.

FIG. 7 shows an embodiment of the GUI associated with a contract manager portion of the TRM.

FIG. 8 shows an embodiment of the GUI associated with a catalog listing managed by a product manager portion of the TRM.

FIG. 9 shows an embodiment of the GUIs associated with listing and setup of workflows managed by the product manager portion of the TRM.

FIG. 10 shows an embodiment of the GUIs associated with task schedules and detailed views thereof as managed by a work manager portion of the TRM.

FIG. 11 is a process flow diagram showing an embodiment of the processes performed by the TRM for demand determination and scheduling.

FIG. 12 is a process flow diagram showing an embodiment of the processes performed by the TRM for monitoring compliance with service level agreements.

FIG. 13 shows an embodiment of the GUIs associated with lease and license compliance.

FIG. 14 is a process flow diagram showing an embodiment of the processes performed by the TRM for monitoring lease and license compliance.

FIG. 15 is a process flow diagram showing an embodiment of the processes performed by the TRM for security compliance of assets.

FIG. 16 is a process flow diagram showing an embodiment of the processes performed by the TRM for generating provisioning recommendations.

FIG. 19 is a process flow diagram showing an embodiment of the processes performed by the TRM for management of software patches and upgrades.

FIG. 20 is a process flow diagram showing an embodiment of the processes performed by the TRM for product modeling.

DETAILED DESCRIPTION OF THE EMBODIMENTS

A method and apparatus for a technology resource manager (TRM) application is disclosed which provides information technology (IT) professionals with an integrated and comprehensive software environment to manage and automate the various processes associated with technology resource management. The TRM manages in various embodiments of the invention: demand, service level agreements (SLA), assets both hardware and software, projects, labor, knowledge, provisioning and IT metrics for hosted applications. The TRM application increases the productivity of the IT organization by improving visibility and control over the hosted applications. The TRM application offers to the chief information officers (CIO)s of each client group accessing the hosted applications as well as to the IT staff responsible for building and maintaining the hosted applications varying levels of visibility and control. The TRM provides visibility and control to IT professionals within the ASP organization over all hosted applications, and visibility and control to IT administrators within each of the client group covering only the applications hosted for the corresponding client group.

Figure 1:
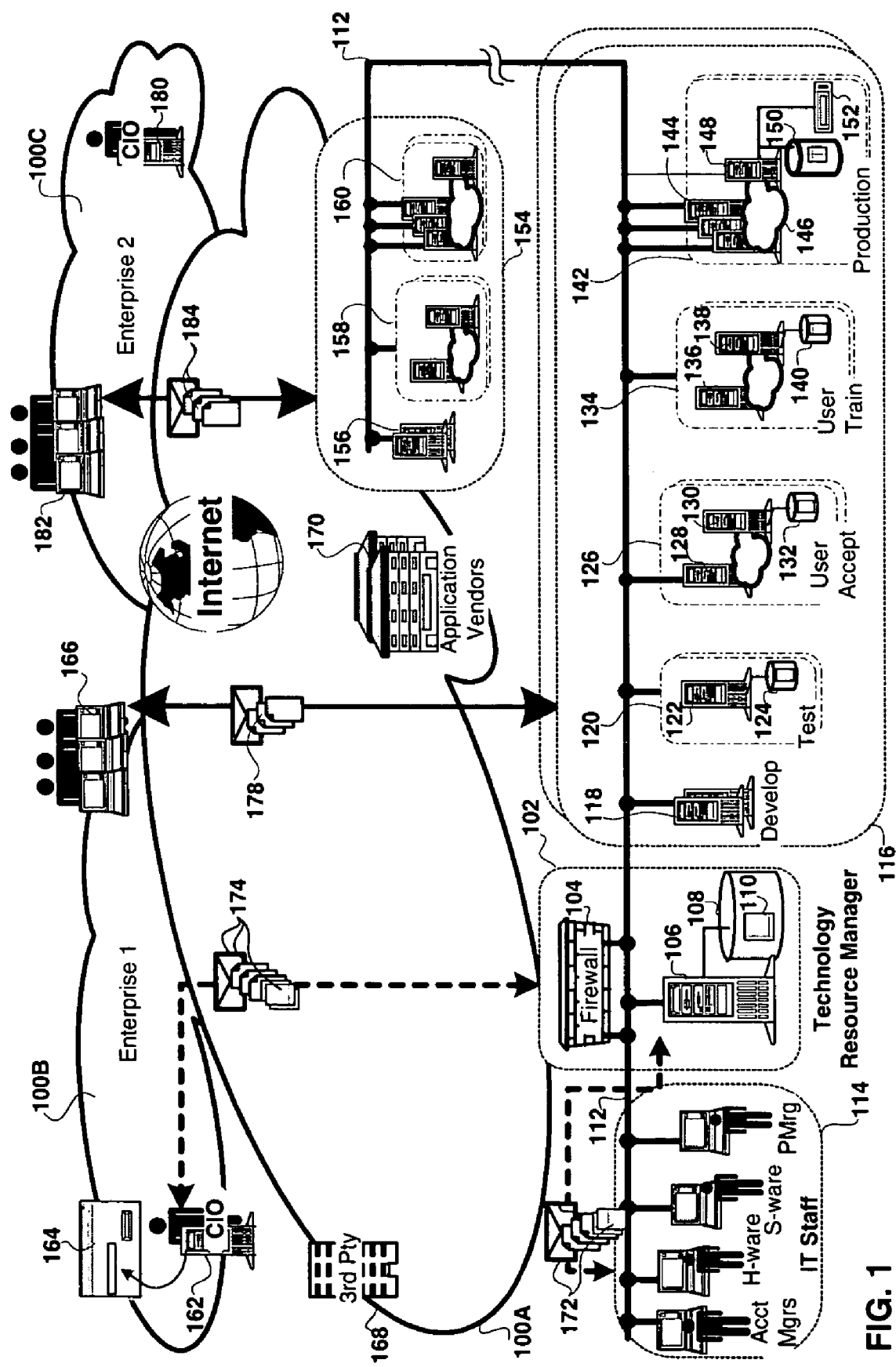
FIG. 1 shows an embodiment of the current invention with a technology resource manager (TRM) coupled both to application hosting servers as well as to information technology (IT) staff.

FIG. 1 shows an embodiment of the current invention with a TRM 102 coupled to: a plurality of host servers 116, 154; to an information technology staff 114; and to clients 162, 166, 168, 170, 180, 182 across networks 100A,B,C. The TRM manages technology resources including the IT staff and the plurality of servers, to deliver applications on the plurality of host servers to corresponding ones of the clients. Clients include: application vendors 170 who provide the software applications hosted on corresponding ones of the servers 116, 154; 3rd party business partners 168 and enterprises including administrative 162, 180 and employee 166,182 members of each enterprise.

The TRM 102 comprises, in this embodiment of the invention: at least one server 106, memory 108, as well as tables, program code and user interfaces collectively 110 for executing the TRM processes. A firewall 104 may be provided to couple the TRM to an un-secure network such as the Internet over which applications may be hosted. The TRM may, in an embodiment of the invention, be provided by an application service provider (ASP) to manage its technology resources so as to deliver hosted applications to a range of client groups corporate and governmental. The TRM may, in an alternate embodiment of the invention, be provided by an enterprise to its client groups, e.g.: vendors, business divisions, subsidiaries and employees so as to deliver a range of hosted applications to the enterprise at large. In this latter embodiment the actual servers may be deployed at the Enterprise itself or outsourced to one or more ASP.

The networks to which the TRM is coupled may include: local area networks (LAN), wide area networks (WAN) as well as the Internet. The TRM may manage hosted servers at a plurality of locations.

Two client groups are shown. The term "client" will be used interchangeably to refer to a particular user and/or to a computer or other network access device available to the user. The first client group includes an administrator 162, employees 166 and 3rd party business partner(s) 168. The second client group includes an administrator 180 and employees 182. Employees 166 and 182 of both client groups are shown exchanging client data 178, 184 respectively with corresponding ones of the plurality of servers 116, 154.

The plurality of servers are shown providing a set of environments to each client group. Each environment is at least logically, and perhaps physically, separate from other environments in the set. All environments within a set have in common at least one application. An environment that exists uniquely on a discrete machine is a physical environment. Environments that exist on different partitions of the same server or set of servers along with other environments of the same or other environmental sets are said to be logical environments.

Servers 116 provide an application(s) across a range of environments which collectively form an environmental set. Each application or each client group may require its own environmental set. A typical environmental set includes: a development environment 118, a test environment 120, a user acceptance environment 126, a user training environment 134 and a production environment 142. The environments provide discrete instances of a hosted application(s), each targeted to a different audience and all dedicated to improving the integrity and reducing the downtime of the critical production environment on which all members of a client group depend.

The production environment 142 includes all application components as well as complete client data. Client data flows directly to/from the users within a client group and the corresponding server(s). In a business exchange client data would include: product identification, trade quantities, and pricing. In a CRM application client data would include: customer name, address, and order history. In a financial application client data would include: accounts payable or receivable. Each production environment handles for the corresponding client group the 24/7/365 business of the client group and its 3rd party partners. The production environment is typically hosted on multiple physical machines each with one or more of the application components of a networked application which may include: a web agent, an application and a database. In the embodiment shown in FIG. 1 the production environment includes a bank of servers 144 on which the web agent and application are hosted. These are coupled via a local area network (LAN) 146 with a server 148 on which a database application is hosted. The client data handled by the database application is stored in memory 150 and backed up in a backup storage device 152. The backup storage device is used to recover data in the event of a server failure. In an embodiment of the invention the backup device backs up a plurality of servers across a plurality of client groups and environment sets.

The user training environment 134 includes all application components as well as such minimal client data as is required to support the training. Each user training environment handles for the corresponding client group the training of new members of a client group on an existing application or of old members of a client group on a new module of an application. All the training is done separately from the production environment so that any errors in the entry of client data by the trainees will not effect the accuracy of the client data in the production environment. The user training environment does not require the bandwidth of a production environment. Therefore fewer servers are utilized. In the embodiment shown in FIG. 1 the user training environment includes a server 136 on which the web agent and application are hosted. This is coupled with a server 138 on which a database application is hosted. The client data handled by the database application is stored in memory 140. No backup is provided since the integrity of the client training data is not critical to the client group.

The user acceptance environment 126 includes all application components and little or no client data. Each user acceptance environment allows employees within a client group to evaluate a new application, upgrade or customization. In the embodiment shown in FIG. 1 the user acceptance environment includes a server 128 on which the web agent and application are hosted. This is coupled with a server 130 on which a database application is hosted. Any client data handled by the database application is stored in memory 132.

The test environment 120 includes all application components as well as such minimal client data as is required to support the testing. Each test environment provides for the information technology (IT) department of the corresponding client group the ability to test a new application or upgrades to an existing application. The test environment requires very little bandwidth, therefore only one server 122 with accompanying storage 124 is provided.

The development environment includes a portion of the application components as well as such minimal client data as is required to support the testing. Each development environment provides for the IT department of the corresponding client group the ability to customize an existing application by adding for example a new report capability. The development environment requires very little bandwidth, therefore only one server is shown.

The hosted servers 154, are broken up into environmental sets as well, with environments 156-160 shown.

Any type of application may be hosted across the different environments within a client group's environmental set. Representative applications provided by vendors 170 include: business exchanges such as SAPMarkets™, SAP AG Walldorf Germany, and Commerce One.net™, Commerce One, Inc., Pleasanton, Calif.; or customer relationship management (CRM) applications such as Siebel System 7™, Siebel Systems, Inc. San Mateo, Calif.; or financial management applications such as PeopleSoft 8™, PeopleSoft Inc., Pleasanton, Calif. 94588-8618. The application(s) require other software components to operate. The components required to deliver an application are typically provided by others of the vendors 170. Software components include: operating systems such as Windows™ 2000, Microsoft Corp. Redmond, Wash. or Solaris™ 9 Sun Microsystems Inc. Palo Alto, Calif.; a web agent such as Apache, by the Apache Software Foundation, Forest Hill, Md. or IIS™ by Microsoft Corp. Redmond, Wash.; an application such as those discussed above, an application server such as WebSphere™ by IBM Corp. White Plains N.Y. or WebLogic™ by BEA Systems of San Jose, Calif.; a database such as MS SQL™ by Microsoft Corp. Redmond, Wash. or Oracle 9i™ by Oracle, Redwood Shores, Calif. or DB2™ by IBM Corp. White Plains N.Y. and additional components such as anti-virus and tape-backup software for example.

In the embodiment shown in FIG. 1 the CIO 162 of Enterprise "1" accesses 174 the TRM 102 in order to enter, view or monitor: demand, service level agreements (SLAs), assets both hardware and software, projects, labor, knowledge, provisioning and IT metrics for application(s) for his/her group. The IT staff 112 of the ASP or Enterprise responsible for the TRM accesses 172 the TRM in order to manage: demand, service level agreements (SLA), assets both hardware and software, projects, labor, knowledge, provisioning and IT metrics for all client groups.

FIG. 2 is a hardware block diagram of a computer suitable for use in executing the processes associated with the TRM shown in FIG. 1. The hardware blocks associated with the TRM server 106 are shown. The TRM server includes: an input output (I/O) module 206, a network interface card (NIC) 208, a main memory 210, a read only memory (ROM) 212, mass storage driver 214 and a processor 204 coupled to one another via a system bus 200. The I/O module handles the user interface devices such as the keyboard and display (not shown). The NIC handles the packetized communication of the application manager server with both the external network 100A-C via the firewall as well as with the plurality of servers 116, 154 and the IT staff 114 via a virtual private network (VPN) or other secure links 112. The ROM is a non-volatile memory which stores the basic input/output system (BIOS) for the server. The main memory is a random access memory (RAM) which stores data and instructions on which the processor is operating. The instructions come from program code and applications stored in non-volatile memory 108. The server is coupled with the memory via the mass storage driver which handle the details of reading and writing data. The memory stores files 110 which include: the program code, tables and graphical user interfaces (GUI)s for implementing the TRM processes as well as for interfacing the IT staff and client administrators with the TRM.

FIG. 3 is a software block diagram showing the software modules associated collectively with various embodiments of the TRM set forth in the following figures and accompanying descriptions. The TRM includes a database portion 328 and an application portion 330. The database portion 328 includes the various tables 110 in which TRM data is stored. The application portion provides a plurality of modules for managing technology resources. These include: a palette manager 334, a data transfer module 340, a user administration module 342, an account manager 346, a knowledge linker 352, an asset manager 354, a contract manager 368, a product manager 378, a work manager 390 and an access controller and presentation layer 332. The palette module manages setup and display of a user specific home page and the retrieval, formulation and display of summary views of data obtained from selected ones of the modules within the application portion. The data transfer module allows setup, scheduling, and execution of control files which govern administrative data transfers (ADT) to/from targeted application(s). ADTs include both electronic data transfers (EDT) as well as application maintenance data transfers. Examples of EDT include bulk transfers of data in the form of customer lists, tax tables, inventory updates to/or from a targeted application by the a client group or business partners of a client group. Examples of application maintenance data transfers include: upgrades, patches, add-ins and add-ons provided from application vendors for a corresponding one of the hosted applications. The user administration module provides delegated administrators within each client group the ability to control user access to environments and applications provided for the associated client group. In an embodiment of the invention the user administration module may provide single sign on capability across all applications accessible to any user within a client group. The account manager handles the billing of individual client groups as well as the ordering of hardware and software assets. The knowledge linker provides uniform storage and retrieval methodologies for the TRM information stored in the database. The asset manager manages demand for assets required to deploy and maintain the hosted applications. Hardware assets include: servers, switches, gateways, backup devices, access lines and the leases associated therewith. Software assets include: operating systems; web agent, application server and database server software; application software; virus protection, security, monitoring, backup software, etc. and the licenses associated therewith. The contract manager manages the recording of new contracts. The product manager manages the definition of products including: a product catalog, workflows, standard operating procedures (SOP), an asset dictionary and automations. The work manager manages scheduling of tasks and of IT staff employees to both meet the demand for new assets as well as to maintain existing assets. The access controller and presentation layer controls access to the TRM and GUIs associated therewith.

Access to the TRM is shown with a first set of access paths or vectors 300 which is available to the IT staff with primary responsibility for the hosted applications as well as the CIOs of the client groups which access one or more of the hosted applications. The access paths/vectors for this set include: home page 304 which provides a user specific palette of summary views of the various TRM processes; knowledge store (kstore) 306 which is a search engine for the information stored by the TRM; billing 308 which provides access to invoices and orders; provisioning 310 which allows various levels of self-service for both administrative data transfers and user administration; security 312 which provides for certification and monitoring of assets; asset 314 which provides access to and views of the managed assets; and contract and demand 316 which provides for entry and recordation of contracts, service requests and change orders. A second set of access paths or vectors 302 is also provided which is available only to the IT staff with primary responsibility for the hosted applications. The access paths/vectors for this set include: authoring 318 for update and entry of the product definitions; compliance 320 for hardware and software lease and license monitoring and compliance; labor 322 for viewing and updating the schedule(s) maintained for each of the IT staff; and project manager 324 for the overall view of all the projects and related schedules therefore.

Figure 4:
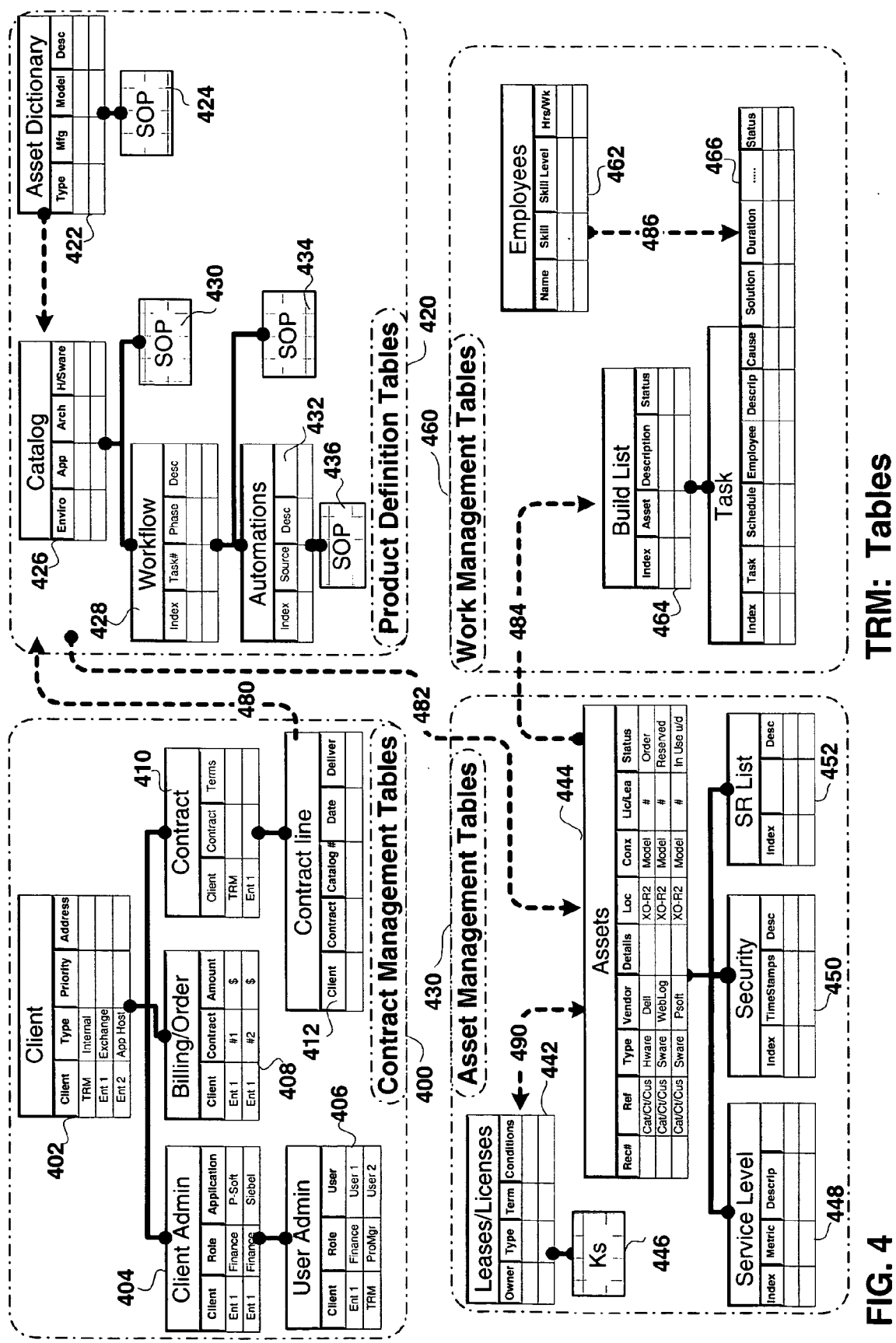
FIG. 4 illustrates a block diagram of an embodiment of the database architecture for the TRM.

FIG. 4 shows an embodiment of a portion of the database architecture for the TRM including: the contract management tables 400, the product definition tables 420, the asset management tables 430 and the work management tables 460. The contract manager 368 (See FIG. 3) manages the contract management tables which include: client table 402, client administration table 404, user administration table 406, billing and ordering table 408, contract table 410 and contract line item table 412. The product manager 378 (See FIG. 3) manages the product definition tables which include: the asset dictionary 422, the catalog 426, the workflow table 428, the automations table 432 and their related SOP tables 424, 430, 434 and 436 respectively. The asset manager 354 (See FIG. 3) manages the asset management tables including: the lease and license table 442 and related knowledge store table 446, the asset table 444, the service level metric table 448, the security table 450 and the service request table 452. The work manager 390 (See FIG. 3) manages the work management tables including: the employee table 462, the build list 464, and the task table 466.

FIG. 5 shows an embodiment of the home page 500 and palette setup 540 GUIs. The home page GUI includes a menu portion 502 for selecting various access paths/vectors into the TRM, and a palette portion 504. In the palette portion summary views from various modules within the TRM are graphically presented and include: account representative 506, notifications 508, service level metrics 510, asset status graphs 512-514, project dashboard 520, service request list 522 and billing summary 524. Control over which summary views to display and where on the GUI to display them is provided by the palette setup GUI. Selection of the "personalize" icon 530 results in display of the palette setup GUI. The palette setup GUI includes a menu portion 542 with a list of available summary views and a location selection portion 544. The user controls palette setup by selecting from the menu the summary views to display on their home page. Selection of any view includes the choice of the column on the home page in which a given view is to be displayed. "Left, Center, and Right" icons 550, 552, 554 are presented in each row of the menu to indicate the user's column preferences. Once a menu item is selected it appears as an entry in one of lists 560, 562, 564 each corresponding with one of the selectable columns in which to display a view. In these lists icons are provided for arranging the order of the views on the list and hence the ordering of the views presented on the palette portion 504 of the home page.

FIG. 3B shows the relationship between and the portion of the modules of the TRM embodiment shown in FIG. 3A that are required to present the home page and palette setup GUIs discussed above in FIG. 5.

FIG. 6 is a process flow diagram of the processes executed by the TRM in an embodiment of the invention in connection with user specific setup and display of the palette portion of the home page. Processing begins at step 600 in which the user selects the home page from the menu of a GUI. In decision process 602 the TRM determines whether the user wants to personalize the home page. Personalizing the home page involves in process 604 the selection of views and view locations by the user. In processes 606-608 user palette preferences are determined. In decision process 610 and the following processes 614-618 each view is assembled. Assembly includes in process 614 getting the summary procedures for a view. Then in process 616 the query and functions associated with the view are executed by the palette manager 334 (See FIG. 3) on either or both the corresponding module or directly on the database. In process 618 the summary view is injected into the corresponding portion of the home page, after which control returns to decision process 618 for the assembly of the next view. When all views have been assembled control passes to process 612 in which the fully assembled page is presented to the user.

FIG. 7 shows an embodiment of the GUI 700 for entering contract summary data. Fields 702, 704, 706, 708 are presented for entering a client identifier; a contract termination date, contract payment terms, and a quantity of free support hours respectively. Radio select icons 710 and 712 are presented for selection of service level metrics including uptime and response times respectively. Penalties 716 for failure to meet service level metrics are shown. Carveouts 714 to the penalties are also defined. Further detail of the contract including specific line items thereof are shown in list format with line numbers for each row in column 720; with dropdown lists for selecting application, architecture and environment in columns 722, 726, and 728 respectively; with fields for entering number of expected users, milestones, schedule and price in columns 724, 736, 738, and 740 respectively; and with checkboxes for selecting backup, monitoring and disaster recovery for each contract line item in columns 730, 732 and 734 respectively. Selection of submit button icon 750 results in entry of the contract data in the contract tables 410-412 (See FIG. 4).

FIG. 8 shows an embodiment of the GUI 800 for viewing the product records in the catalog table 426. Each record corresponds with an environment and architecture for hosting an application. Within each product record, the number and type of servers, the software from the operating system on up, security metrics, backup and connectivity information are specified in detail. Each product record contains links to associated workflows and SOPs. In the embodiment shown, product records are sorted first by architecture and then by environment. The architectures shown in this embodiment are web architectures and are characterized as 3, 2, or 1 tier depending on whether the web agent, web application server and database server software are located on separate servers (3 tier), a pair of servers (2 tier) or on a single server (1 tier) for example. Individual columns 806, 808, and 810 show the entries for each record for the web agent, web application server and database server portions of each environment and the hardware, operating system, network, connectivity and security settings for each. The product records are sorted by architecture with 3 tier, 2 tier and 1 tier server implementations underneath the corresponding headers 820, 840 and 850. Several records are shown for each. An "add" icon 802 is provided for entering a new record to the catalog.

In an alternate embodiment of the invention in which the TRM lacks a contract manager module, demand for assets may be generated by direct selection of a product record from the catalog and by injection of a copy thereof into the asset table 444 (See FIG. 4). Where the TRM supports direct selection of product records from the catalog, the GUI 800 may include additional icons for selecting a record, e.g. checkboxes 828-830 and for selecting the scaling of the environment, e.g. the number of servers. For the records with a single tier architecture where the web agent, application and database software reside on a single server, a single dropdown list icon 852 is provided for selecting a number of servers. For the records with a two tier architecture two dropdown list icons 842, 844 are provided for selecting the number of servers for the web agent together with the application server software and for selecting the number of servers for the database server respectively. For the records with the three tier architecture three dropdown list icons 822, 824, and 826 are provided. In this embodiment of the invention a catalog item is selected for copying to the asset table by the selection of the checkbox icon for the corresponding record and by selection of the "enter" button icon 804.

FIG. 9 shows an embodiment of the GUI 900 for displaying a list of the tasks associated with a single workflow identified with a workflow identifier in field 904 and tagged to one or more catalog records identified in field 902. A workflow identifies the tasks required to build a catalog record or portion thereof. Each task comprises a task description, associated assets on or with which to perform the task, labor type or skill needed to perform the particular task and the level of skill required to do so, along with the estimated time to perform the task. Selection of button icon 906 results in a display of GUI 910 which is a task form for adding a particular task into a workflow. Fields are provided on the form for entering task number 912, description 914, SOPs 916, dependencies 918, targeted assets 930 on or with which to perform the task, skill type 932, level of skill 934 and estimated man/person hours 936 required to perform the task. Once task parameters are input they are entered into the workflow by selection of button icon 950. Once all tasks of a workflow have been added the workflow is entered as a record in the workflow table 428 (See FIG. 4) by selection of button icon 908.

FIG. 10 shows an embodiment of the GUI 1000 for displaying the scheduling by the TRM of tasks for a member of the IT staff. Tasks result from any of a number of demand inputs including: contracts and service requests. The personal schedule GUI includes a past due portion 1010 in which past due tasks, e.g. task 1012 are displayed and a scheduled portion 1020 with icons representing each task, e.g. task 1022, displayed in a scheduled format. Selection of an individual icon results in display of GUI 1030 in which details of the task are shown. Task parameters include: client, project, asset, and task identifiers, task description 1032 and SOPs 1034. When a staff member has completed a task they enter: time to complete 1038, completion date 1040 and status 1042, and enter the data by selection of button icon 1044. The systematic identification of time to complete allows closed loop feedback as to estimated vs. actual time to complete a task. Where the task relates to a service request the staff member also enters service request resolution parameters 1036 including root cause and solution. The systematic identification of root cause, e.g. asset, SOP, workflow etc. and solution provides the closed loop feedback required to improve SOPs and workflows for example.

FIG. 3C shows the relationship between and the portion of the modules of the TRM embodiment shown in FIG. 3A that are required to handle demand, e.g. service requests and contracts, and demand scheduling as described above in FIGS. 7-10 and the accompanying text. In this embodiment of the invention the work manager 390 includes sub-modules 392, 394 for building a task list and for scheduling tasks respectively.

FIG. 11 is a process flow diagram showing the processes executed by the TRM for demand and demand scheduling in the embodiment of the invention described above in FIGS. 7-10 and the accompanying text. After start block 1100 there are four general process steps 1102, 1110, 1120 and 1130 for determining demand, for allocating available assets to meet the demand, for ordering assets to meet remaining demand and for allocating employee resources to assemble the assets to fulfill the demand. Assembly of assets may include for example: hardware configuration, software configuration, security configuration, network configuration, etc. The demand determination step involves the sub-steps of: sweeping contract line items to determine new and expired contracts 1104, correlating each contract line item of the new and expired contracts with a catalog record 1106, and adding an instance of the contract record(s) to the asset table 1108. The asset allocation step involves the substeps of: releasing the assets which correlate with expired contracts 1112, sweeping the asset table to determine new asset demands 1114 and of reserving available free assets to meet the demand 1116. The ordering step involves the sub-steps of: determining new assets required to fulfill the asset demand 1122 and of generating orders or order notifications for the new assets 1124. The employee allocation step involves the sub-steps of: adding new asset builds for the allocated and ordered assets to the build list 1132 and of determining and adding new service requests to the build list 1134. Next in step 1136 all entries in the build list are updated with pointers/tags to the associated: workflows, SOPs, and automations. In step 1138 SRs and asset builds on the build list and the task(s) associated with each are allocated to employees with corresponding skills and skill levels. In an embodiment of the invention in which the work manager includes a scheduler sub-module 394 (See FIG. 3C), the allocation criteria include employee availability.

The processes set forth above in FIG. 11 result in corresponding data flows 480-486 within the tables shown in FIG. 4. As each new contract line item is entered in the contract line item table 412 it is matched 480 with a corresponding catalog record an instance/copy of which is injected 482 into the asset table. An instance of each asset associated with the catalog record is then injected 484 into the build list 464. For each asset the associated tasks are determined from the associated workflows and injected into the task table 466 and allocated to eligible employees based on skill, skill level, and availability.

FIG. 12 is a process flow diagram of an embodiment of the processes associated with an embodiment of the invention in which the TRM implements service level billing automations. When a contract to host web applications is signed a service level agreement (SLA) may be included which guarantees minimum service levels. Service level metrics include a range of criteria including: processor utilization, storage space, page delivery time, response time to service requests, etc. Failure to meet these service levels during any billing interval results in pre-defined penalties unless there is an applicable carveout/exception. In an embodiment of the invention the TRM automatically generates billing adjustments and takes carveouts into account in doing so. In another embodiment of the invention the TRM generates projections during a billing interval as to which contracts may be subject to SLA penalties at the end of the billing interval given the trend of current service level metrics. In another embodiment of the invention the TRM calculates the potential credits or penalties.

Service level compliance processes commence after startup 1200 with a determination 1202 as to whether a billing or predictive report is to be generated. The processes associated with generation of a billing report or actual billing adjustment begin with a sweep of the service level table for service level metrics (SLM) for the current billing interval 1204. Then each SLM for the current interval is compared with the corresponding SLA of the associated contract 1206 to determine which SLMs potentially violate the corresponding SLA 1208. Next, a determination in process 1210 as to whether any of the SLM which violate SLA terms include carveouts such as scheduled downtime or client generated interruptions in service. This determination is made by correlating service requests, their root cause and solution with any applicable SLMs. Where the root cause corresponds with a carveout a corresponding reduction in all or part of the associated penalty may be appropriate. Next, in step 1212 a report indicating proposed adjustments (credits/debits) to monthly invoices or actual adjustments to the invoices themselves is generated based on the actual metrics for the interval, the applicable carveouts and penalties. Control then returns to decision process 1202.

The processes associated with generation of a report showing projected SLA violations at the next billing interval begin with a sweep of the service level table for SLM for the current projection interval 1220. Next, the value of each metric at the next billing interval is projected 1222. Then each projected SLM is compared with the corresponding SLA of the associated contract 1224 to determine which SLMs potentially violate the corresponding SLA at the end of the current billing interval 1226. An exception report is then generated 1228 which indicates the potential SLA violations and penalties 1228. Control then returns to decision process 1202.

FIG. 3D shows the portion of the modules of the TRM embodiment shown in FIG. 3A that are required to handle service level billing automations described above in FIG. 12 and the accompanying text. In this embodiment of the invention the asset manager 354 includes sub-module 360 for monitoring service levels on any one or all of the servers 116, 154 (See FIG. 1) managed by the TRM.

FIG. 13 shows GUIs associated with an embodiment of the invention in which the TRM manages asset leasing and licensing including compliance and ordering. A typical hosted application requires one or more servers which may be subject to leases of varying types and durations. The software on each server including: operating system (OS), web agent, web application server, database server, application, monitoring, backup, etc. is also subject to individual licenses of various types and durations. To meet the demand presented by new contracts additional leases and licenses for associated hardware and software must be procured. The asset manager handles: lease and license entry, monitoring, compliance and ordering.

The lease and license list GUI 1300 lists each lease or license. Selection of button icon 1302 results in display of the lease/license form GUI 1310 on which information for a new lease/license record may be entered. Entry fields are provided for: lessor/licensor 1312; for licensee/lessee 1314; lease/license # 1316; asset type 1318; ID 1320; model 1322; price 1324; vendor 1326; expiration conditions 1328, e.g. balloon payment; type 1330; term 1322 and in the case of a user based license the number of users 1334. Upon selection of button icon 1302 this information is entered into lease/license table 442 (See FIG. 4) as a new record.

FIG. 3E shows the portion of the modules of the TRM embodiment shown in FIG. 3A that are required to handle lease and license compliance and ordering described above in FIG. 13 and the accompanying text. In this embodiment of the invention the asset manager 354 includes a user monitor sub-module 362 for monitoring the number of named, concurrent, or aggregate users on each of the plurality of hosting servers 116, 154 (See FIG. 1) and a compliance sub-module 364 for comparing the monitored users or processors on each of the servers 116, 154 (See FIG. 1) managed by the TRM with the corresponding licenses and leases to determine which are compliant and which are out of compliance.

FIG. 14 is a process flow diagram of the processes associated with an embodiment of the invention in which the TRM handles lease and order compliance as discussed above in connection with FIGS. 13 and 3E. After startup 1400 control passes to process 1402 in which new leases and license records are entered into the lease and license table 442 and applied 490 to one or more asset records in the asset table 444 (See FIG. 4). A lease for a block of servers or a software license for an application is recorded in the lease/license table and a reference to the lease, e.g. lease/license #, is entered onto each of the corresponding records in the asset table.

Periodically in processes 1404, lease or license expiration determinations are conducted by the asset manager to determine which leases or licenses are nearing an end of term. The expiration determination begins with process 1406 in which a sweep of the lease or license table is conducted in process to generate a list of leases or licenses with expiration dates in the sweep date range. Then in process 1408 a determination is made as to which of the leases require buyout or renewal. Then in process 1410 the corresponding information is sent to the account manager 346 (See FIG. 3E) for ordering or renewal of the lease or license.

License compliance determinations are made in processes 1414. In process 1416 the actual named, aggregate or concurrent users are compared with the licensed users to determine which assets are non-compliant, i.e. have no licenses, or have licenses which are over-subscribed. Each license in the lease or license table 442, is correlated with the assets covered under the lease and listed in the asset table 444 (See FIG. 4) using the license ID/tag. For each asset a determination is made as to the actual number of named, aggregate, or concurrent users for all corresponding assets. This determination is made using either or both the service level metrics table 448 (See FIG. 4) and the client and user administration tables 404-406. The actual users are then compared with the licensed users to determine which licenses are out of compliance. In process 1418 the compliance of processor based licenses is determined by comparing for each processor based license the actual vs. licensed processors in the asset and lease/license tables respectively for each license. In process 1420 the additional user or processor based licenses required to bring the over-subscribed licenses into compliance is determined using the information gathered in processes 1416-1418. Next in process 1422 order entry information for the additional licenses is sent to the account manager. Finally in process 1424 a billing determination is made for each license and lease ordered by the account manager in processes 1410 and 1422. If the contract for the associated assets to which the lease/license applies calls for client billing, then the client is billed.

FIG. 15 is a process flow diagram of the processes associated with an embodiment of the invention in which the TRM handles security certification and monitoring of assets. After startup 1500 control passes to decision process 1502 in which the next security scan is initiated. Scans may be performed on a particular server of on all servers. In process 1504 a security scan on the selected assets is performed. That scan may include: port scans to determine port availability, service scans to determine available services, password scans to determine the existence of crackable passwords etc. Scans are performed by the security monitor 366. For each asset scanned the security metrics are determined. Security metrics include: open and closed ports, available services, cracked passwords, etc. Next in process 1506 the actual security metrics determined in process 1504 for each server are compared with the target security metrics for the corresponding server asset in the corresponding product record of the catalog table 426 (See FIG. 4). In process 1508 a determination is made as to which servers have actual security metrics which are not compliant with the security metrics defined in the associated record of the catalog. In process 1510 a security report or notice is generated in which assets with non-conforming security metrics are identified with a visual warning indicia, e.g. text, color, or graphic for example.

FIG. 3F shows the portion of the modules of the TRM embodiment shown in FIG. 3A that are required to handle security compliance described above in FIG. 15 and the accompanying text. In this embodiment of the invention the asset manager 354 includes a security monitor sub-module 366 for monitoring security metrics on any or all of the hosting servers 116, 154 (See FIG. 1).

FIG. 16 is a process flow diagram of the processes associated with an embodiment of the invention in which the TRM handles provisioning recommendations. After startup 1600 control passes to decision process 1602 in which the next service level scan is initiated. In process 1604 service level metrics such as: availability, response time to service requests, bandwidth, processor utilization, storage space, page display latency etc. are determined by monitoring the servers 116, 154. Then in process 1606 a determination is made as to which assets have SLM which do not conform to target values/ranges, i.e. which assets are non-compliant. Target values/ranges for each asset may be stored in the catalog table 426 (See FIG. 4). In process 1608 the clients associated with the non-compliant assets are determined and a provisioning recommendation is generated for them in process 1610. A recommendation may include specifics as to asset, target SLM, actual SLM, as well as a recommendation for an asset and purchase price therefore to bring the non-compliant asset(s) into compliance, e.g. more storage space, wider bandwidth.

FIG. 3G shows the portion of the modules of the TRM embodiment shown in FIG. 3A that are required to handle provisioning recommendation as described above in FIG. 16 and the accompanying text. In this embodiment of the invention the asset manager 354 includes a service level monitor sub-module 360 for monitoring security metrics on any or all of the hosting servers 116, 154 (See FIG. 1).

Figure 17:
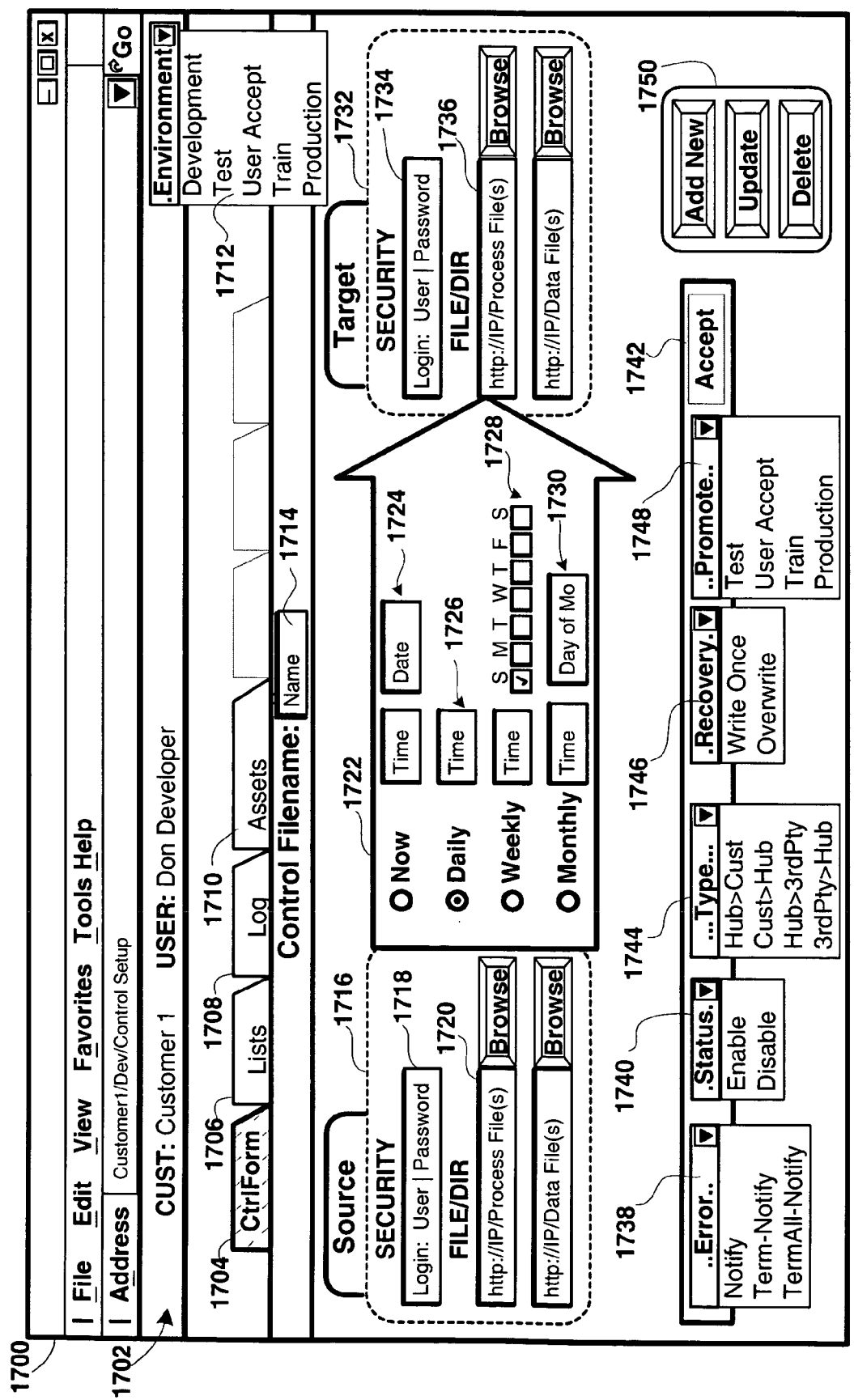
FIG. 17 shows an embodiment of the GUI associated with client setup, display and scheduling of control files for administrative data transfers between associated application servers and selected clients as managed by a data transfer portion of the TRM.

FIG. 17 shows an embodiment of the GUI associated with client setup, display and scheduling of control files by the administrator of each client group for administrative data transfers between associated application servers and selected clients. Client data flow between the server(s) and members of the client group is by no means the only data flow required to support hosted applications. The hosted applications require application maintenance in the form of upgrades, patches, add-ins and add-ons provided from application vendors 170 (See FIG. 1). The client groups business partners 168 (See FIG. 1) may require bulk data transfers of data in the form of customer lists, tax tables, inventory updates etc. The application maintenance and bulk electronic data transfers (EDT) effected by the TRM are collectively referred to as administrative data transfers (ADT). Access to these control file GUIs is limited to those employees of the group with access privileges as determined by the group administrator during contract setup. The members of a group with these access privileges will be referred to as environmental administrators for a group.

A browser window 1700 is shown. An employee 'Don' of the client group identified as Customer 1 is shown accessing the GUI's appropriate to the environment to which Don has access. That environment, e.g. the development environment, is selected via drop-down list 1712. Tab icons 1704, 1706, 1708, 1710 are provided for selecting within the environment: the control file form 1704, the list of control files 1706; the log of previously scheduled control file instances 1708 and the contracted assets 1710. The control file form tab 1704 is selected, resulting in the display of the control file form. The name of the control file being added/updated/deleted is shown in input box icon 1714. For each control file a data source, a schedule, and a data target are input. Data source parameters 1716 include: security parameters 1718 such as user name and password to login to the data source; and path information 1720 either absolute or relative as to the data source. Data target parameters 1732 include: security parameters 1734 such as user name and password to login to the data source; and path information 1736 either absolute or relative as to the data target.

Scheduling of a control file is set up in scheduling block 1722. Scheduling may call for a single execution, or repeated executions. In the embodiment shown icons 1724 specify a single execution of the named control file at a specified data and time. Icons 1726 specify a repeated daily execution of the control file at a specified time. Icons 1728 specify a repeated weekly execution of the control file at a specified time and day(s). Icons 1730 specify a repeated monthly execution of the control file at a specified time and day of the month. Additional parameters may be required for a control file including: error handling, enablement, typing, recovery, and migration.

Execution of control files can be carried out by the application manager alone without the requirement of any corresponding program code on either the data source or data target. This is accomplished by the inclusion in the data source and data target of each control file of the path and security information required to access both the data source and data target.

Error handling parameters determine what to do when a control file fails to execute. Drop-down list icon 1738 allows each control file to be tagged with error handling policies, e.g.: notification, terminate execution and notify, or terminate all and notify. A choice of the 'notification' option results in the notification of the group administrator and/or environment administrator within the group of an error during the execution of a control file. A choice of the 'terminate and notify' option results in notification and termination of further attempts by the application manager to execute the scheduled instance of the control file, but does not prevent scheduling of future instances of the control file. A choice of the 'terminate all and notify' option results in notification and termination of execution attempts on all scheduled instances of the subject control file.

A control file may be enabled and disabled via a corresponding selection in drop down list icon 1740. Control files may be typed via drop-down list 1744 as to: the direction, e.g. inbound and outbound, and source/target for the data, e.g. 3rd party or customer.

Control file execution parameters during the roll-forward portion of a recovery from a failure of an environment may be selected from drop-down list icon 1746. Exemplary choices include: 'write once' or 'overwrite'. Roll-forward refers to that phase of recovery after data on the effected web, application and/or database server has been failed-over to a working platform. During the roll-forward phase control files previously executed after the date and time up to which the environment is recovered will be re-executed subject to certain conditions. One of those conditions is determined by the roll-forward policy selected by the environment administrator at time of control file setup. Where for example, the control file is tagged with a 'write once' and the data transfer called for by the control file is an inbound data transfer, the control file will not be re-executed if the target file exists in the recovered environment. Alternately, where the control file is tagged with 'overwrite' the control file will be re-executed whether or not the target file exists in the recovered environment.

In an embodiment of the invention, migration of a control file may be requested by selecting an environment to which to promote the subject control file. Promotion need not be to a higher level environment. This may be accomplished via drop-down list icon 1748 on which the available environments; e.g. test, user acceptance, training and production are listed. Not all promotion requests will be immediately set up for migration and or for scheduling in the environment to which they are promoted. There may be additional ASP contractual overrides on control file migration. These may result in promotion requests to selected environments, e.g. migration requests to the production environment may be routinely placed on hold until specifically approved by the ASP. The status of a migration request, e.g. 'accept' or 'on hold', is displayed in field 1742.

Icon set 1750 allows the environmental administrator to add new control files with the above discussed parameters and to delete or edit existing control files. The data entered via the control file form is retained within the database 328 as individual control files (See FIG. 3A).

Figure 18:
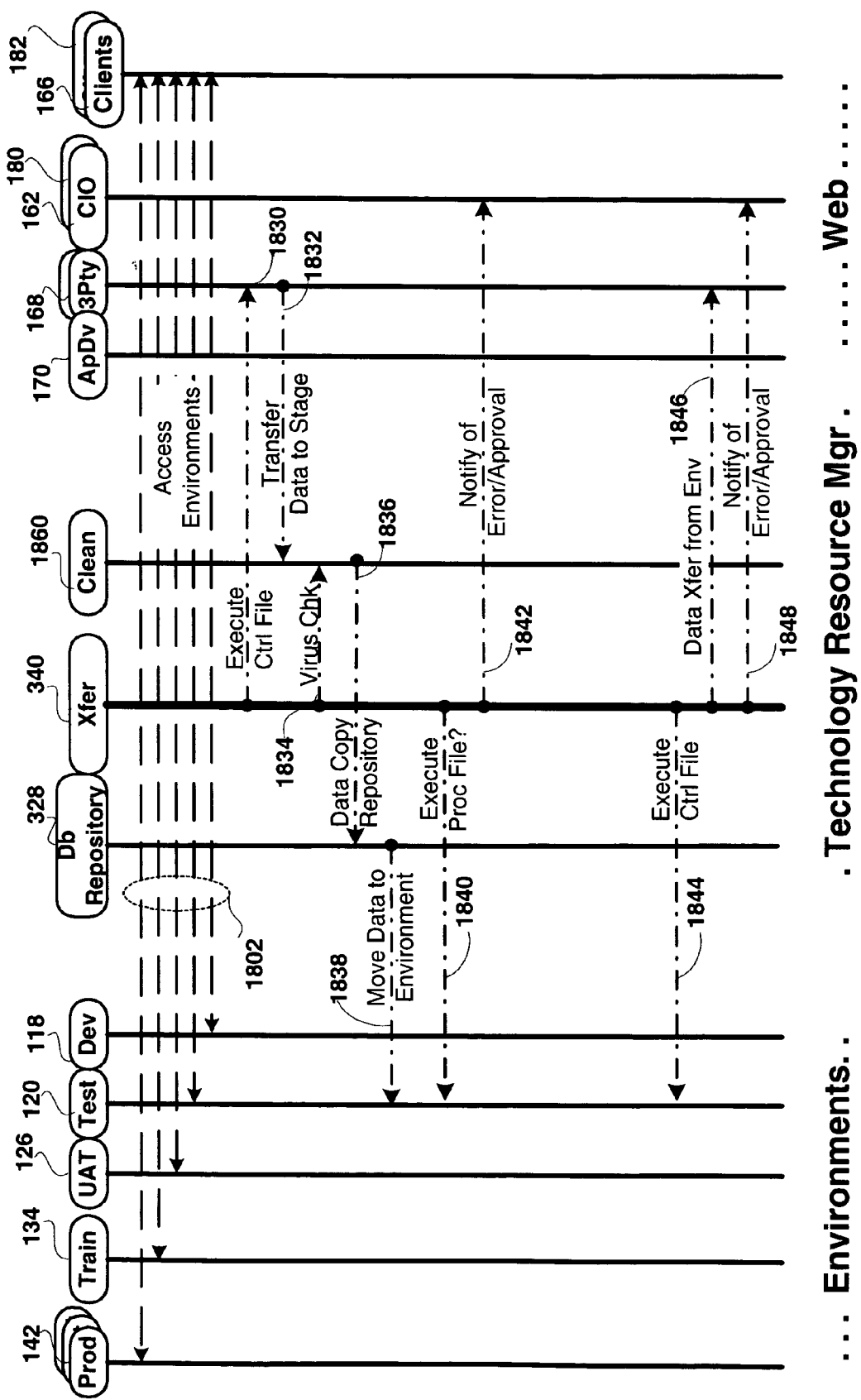
FIG. 18 is a candlestick diagram of an embodiment of the data transfers associated with control file execution as managed by the data transfer portion of the TRM.

FIG. 18 is a candlestick diagram of an embodiment of the TRM which manages data transfers associated with control file setup, execution, and recovery in the embodiment of the invention shown in FIG. 1. Candlesticks are shown for: clients 166 and 182; client chief information officers (CIO) 162-180; 3rd parties 168; application developers 170; cleanup server 1800; data transfer module 340; database 328; development environment 118; test environment 120; user acceptance environment 126; training environment 134; and production environment 142 (See FIG. 1).

FIG. 18 shows the steps performed by the TRM for control file execution for inbound and outbound ADTs. Control file execution can be used in an embodiment of the invention for injecting an patch or upgrade from an application vendor onto a corresponding server. Arrows 1802 indicate access by corresponding members of all the client groups to the corresponding ones of their group's environments, during control file execution. Processing of control files the execution of which results in an inbound data transfers is shown in steps 1830-1842.

Execution of a control file which specifies an inbound data transfer begins with step 1830. The TRM executes the next scheduled instance of a control file. The control file in this example calls for an inbound data transfer from 3rd party 168 for example. Using the login and path information for the data source on the 3rd party server the TRM initiates an inbound data transfer 1832. The data is transferred to the cleanup server 1800. A cleanup server may in an embodiment of the invention be outside the firewall 104 shown in FIG. 1 and may be utilized to run anti-virus and other scans on inbound ADTs. In step 1834 the TRM initiates a virus check on the inbound data in the cleanup server. Next, the TRM moves a copy of the inbound data to a repository within database 332. Then in step 1838 the TRM using the target information in the control file and any re-mapping thereof by an environmental mapper moves the data, e.g. patch or upgrade, to the target location on the environment specified in the control file, which in the example shown is the test environment 120. Then in step 1840 any accompanying process file the execution of which is required to inject the transferred data into the application or database is executed at the initiation of the TRM. The TRM has full access rights to all environments over a VPN or other secure link. In step 1842 the TRM determines whether either the ASP or the client administrator has set their global or contractual data policies respectively to require notification when a control file is executed. If they have then via e-mail or other communication method the notice is delivered. Additionally, if the TRM detects an error in the execution of the control file then notice of the error may also be delivered.

Execution of a control file which specifies an outbound data transfer begins with step 1844. The TRM executes the next scheduled control file instance. The control file in this example calls for an outbound data transfer from a data source in one of the environments, e.g. test environment 120. The extracted data is passed in step 1846 by the TRM to either the corresponding client or a 3rd party business partner 168 (See FIG. 1) identified as the data target in the control file. In step 1848 the TRM determines whether either the ASP or the client administrator has set their global or contractual data policies respectively to require notification when a control file is executed. If they have then via e-mail or other communication method the notice is delivered. Additionally, if the TRM detects an error in the execution of the control file then notice of the error may also be delivered.

FIG. 19 is a process flow diagram of the processes associated with an embodiment of the invention in which the TRM handles provisioning recommendations. After startup 1600 control passes to process 1902 in which the availability of a patch or upgrade for an application is determined. The availability determination may result from an entry by the TRM staff 114 or by automatic polling of an application vendor's download site by the TRM. In process 1904 a sweep of the asset table 444 (See FIG. 4) is conducted to determine all associated servers and the corresponding clients. Next in step 1906 a notice is given to each client as to the availability of the patch or upgrade and the associated environments hosted for the client which are eligible for the patch or upgrade. Next in decision process 1908 a determination is made as to which clients have accepted the patch or upgrade. Then, in process 1910 the TRM generates corresponding control files and schedules for injecting the patch or upgrades into the associated environments and corresponding assets. Subsequently, in process 1912 the TRM executes the control files and injects the patch/upgrade into the targeted asset.

FIG. 3H shows the portion of the modules of the TRM embodiment shown in FIG. 3A that are required to handle patch and upgrade management as described above in FIG. 19 and the accompanying text. In this embodiment of the invention the asset manager 354 includes an upgrade and patch sub-module 358 for managing patch and upgrade determination, notification, and injection into the associated servers.

FIG. 20 is a process flow diagram of the processes associated with an embodiment of the invention in which the TRM handles product modeling. Product modeling includes: correlating estimated and actual workflow time and cost estimates with actual time and cost estimates to improve product definitions and profitability. After startup 2000 control passes to decision process 2002 in which the next catalog record to be modeled is determined from the catalog tables 426 (See FIG. 4). In process 2004 all instances of the selected product record in the asset tables is determined. Then, in process 2006 the actual asset costs, e.g. hardware, software etc. are determined for each instance from the accounting manager. Next in process 2008 the associated labor costs in terms of actual hours for each task performed in installing and or maintaining the associated instance of the asset is determined from the work manager. In process 2010 the actual costs for all instances of the corresponding product record in the asset table are compared with the price of the assets in the product record. In process 2012 a profitability report for the selected catalog record is prepared from the comparison of the price vs. the costs in the prior process.

FIG. 3I shows the portion of the modules of the TRM embodiment shown in FIG. 3A that are required to handle patch and upgrade management as described above in FIG. 20 and the accompanying text.

In an alternate embodiment of the invention selected modules of the TRM such as the accounting manager 346, the user administration module 342 and/or selected submodules such as the service level monitor 360, the user monitor 362, the security monitor 366 and/or the service level monitor 360 may themselves be stand-alone applications the application specific interfaces (API) or common object model (.COM) interfaces of which are accessed by the TRM to perform the above discussed processes without departing from the scope of the claimed invention.

In an alternate embodiment of the invention the notices or reports generated for IT staff or CIO's may be delivered to the corresponding staff member or CIO via any one of a plurality of communications mediums: wired or wireless, in any of a plurality of formats including: wireless access protocol (WAP), e-mail, pager, telephone etc. without departing from the scope of the claimed invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An enterprise information handling system, comprising:
a plurality of hardware and software assets hosted on one or more servers connected to a network;
a plurality of client-side network access devices connected on the network to the one or more servers to use the hardware and software assets;
a resource center connected on the network to the one or more servers, the plurality of hardware and software assets, and the plurality of client-side network access devices, the resource center controlling the plurality of client-side network access devices' use of the hardware and software assets according to one or more agreements, the resource center comprising:
a processing device connected to at least one memory;
a database stored in at least one memory, the database comprising data of the plurality of client-side network access devices, the hardware assets, the software assets, the agreements, metrics of the actual use, a demand of the one or more of the plurality of client-side network access devices to use the hardware and software assets; and an application center operationally connected to the processing device, the memory, and the database, the application center having a plurality of management modules executable in the processing device of the resource center that read from and write to the database and control data transfer, user administration, accounts, assets, agreements, products, tasks of the use of the hardware and software assets by the one or more of the plurality of client-side network access devices; and wherein the resource center further monitors actual use of the hardware and software assets by one or more of the plurality of client-side network access devices and determines if the actual use is in violation of one or more agreements, and automatically generates billing adjustments based on violation of one or more agreement; and an agreement management module of the application center and executable in the processing device determines if any of the agreements have expired or will expire in a sweep date range.

2. The information handling enterprise system of claim 1, wherein the one or more agreements is a service level agreement.

3. The information handling enterprise system of claim 1, wherein the agreement management module determines if any of the agreements are out of compliance.

4. The information handling enterprise system of claim 1, wherein a provisioning recommendation module of the application center executable in the processing device determines that a patch, an upgrade or a replacement of an asset is recommended to bring a non-compliant asset into compliance with an agreement.

5. A technology resource manager for managing technology resources including host servers, selected ones of which provide at least one application accessible to a plurality of client-side network access devices across a network; the technology resource manager comprising:

at least one computer processing device for executing and at least one computer memory for storing at least a plurality of executable modules, the computer processing device and at least one computer memory connected to the network;

a database stored in at least one computer memory, the database comprising data of the plurality of client-side network access devices, the hardware assets, the software assets, the agreements, metrics of the actual use, a demand of the one or more of the plurality of client-side network access devices to use the hardware and software assets; and an application center operationally connected to the computer processing device, at least one computer memory and the database, the application center having a plurality of management modules executable in the computer processing device of the technology resource manager that read from and write to the database and control data transfer, user administration, accounts, assets, agreements, products, tasks of the use of the hardware and software assets by the one or more of the plurality of client-side network access devices; and a contract manager module within the application center and executable in the computer processing device for managing contracts for each client-side network access device with each contract expressed in terms of contract parameters including at least service level metrics and determining if any of the agreements have expired or will expire in a sweep date range; and an asset manager module within the application center and executable in the computer processing device and coupled to the contract manager module and configured to couple to the host servers and to the network, the asset manager module controlling assets including the host servers and software deployed thereon by monitoring actual service level metrics of the assets and by determining the assets for which actual monitored service level metrics violate contract service level metrics, wherein the technology resource manager automatically generates billing adjustments based on violation of the contract service level metrics.

6. The technology resource manager for managing technology resources of claim 5, wherein the asset manager module further monitors service level metrics over a portion of a billing interval and projects service level metrics for an entire billing interval to determine the assets for which projected service level metrics may violate contract service level metrics.

* * * * *